United States Patent [19]

Amano et al.

[11] Patent Number: 5,359,008
[45] Date of Patent: Oct. 25, 1994

[54] SECOND-ORDER NONLINEAR OPTICAL POLYMER AND METHOD FOR PRODUCING THE SAME

[75] Inventors: Michiyuki Amano, Urizura; Makoto Hikita, Mito; Satoru Tomaru, Mito; Toshikuni Kaino, Mito; Yoshito Shuto, Hitachi, all of Japan

[73] Assignee: Nippon Telegraph and Telephone Corporation, Tokyo, Japan

[21] Appl. No.: 62,138

[22] Filed: May 17, 1993

[30] Foreign Application Priority Data

May 18, 1992 [JP] Japan .................. 4-149995

[51] Int. Cl.$^5$ .............. C08F 222/30; C08F 228/06; C08F 8/32
[52] U.S. Cl. .................. 525/295; 525/279; 525/293; 525/291; 525/328.2; 525/376; 525/377; 526/298; 526/311; 526/257; 528/372
[58] Field of Search ............ 525/328.2, 279, 293, 525/295; 526/298, 311; 528/372

[56] References Cited

U.S. PATENT DOCUMENTS 4,894,263 1/1990 Dubois et al. .................. 428/1
5,284,922 2/1994 Amano et al. .................. 525/328.2

FOREIGN PATENT DOCUMENTS 63-227665 9/1988 Japan .

OTHER PUBLICATIONS

Engle, M. et al. (1985) Pure & Appl. Chem. 57(7), 1009–1014.

"Electro-optic phase modulation and optical second-harmonic generation in corona-poled polymer films", Singer et al., Appl. Phys. Lett., vol. 53, No. 19, pp. 1800–1802, Nov. 7, 1988.

"Developments of Optically Nonlinear Polymers and Devices", Moehlmann, G., Synthetic Metals, vol. 37, pp. 207–221, 1990.

"Optical nonlinearities of conjugated molecules. Stilbene derivatives and highly polar aromatic compounds", Oudar, J. L., The Journal of Chemical Physics, vol. 67, No. 2, pp. 446–457, Jul. 15, 1977.

"Second-order nonlinearity of a novel diazo-dye-attached polymer", Amano et al., J. Appl. Phys., vol. 68, No. 12, pp. 6024–6028, Dec. 15, 1990.

*Primary Examiner*—Mark Nagumo
*Attorney, Agent, or Firm*—Finnegan, Henderson, Farabow, Garrett & Dunner

[57] ABSTRACT

The present invention provides a second-order nonlinear optical polymer including a polymer backbone and side groups bonded to the polymer backbone, wherein the side groups include one or more of a first nonlinear optical group represented by the following formula (C-1) and one or more of a second nonlinear optical group represented by the following formula (C-2) or (C-2)':

$$-D_1-\pi_1-X_1=Y_1 \cdots \quad (C\text{-}1)$$
$$\cdots \pi_{n-1}-X_{n-1}=Y_{n-1}-\pi_n-A_1$$
$$-D_2-\pi_1'-X_1'=Y_1'-\pi_2'-A_2 \quad (C\text{-}2)$$
$$-D_3-\pi_1''-A_3 \quad (C\text{-}2)'$$

wherein $\pi_1$ to $\pi_n$, $\pi'_1$, $\pi'_2$, and $\pi''_1$ each represent independently a $\pi$-conjugated cyclic compound group; $X_1$ to $X_{n-1}$, $X'_1$, $Y_1$ to $Y_{n-1}$, and $Y'_1$ each represent independently CH, N, or N→O; $A_1$, $A_2$, and $A_3$ each represent independently an electron attracting group; $D_1$, $D_2$, and $D_3$ each represent independently an electron donating group; and n represents an integer of 3 or greater.

10 Claims, No Drawings

SECOND-ORDER NONLINEAR OPTICAL POLYMER AND METHOD FOR PRODUCING THE SAME

BACKGROUND OF THE INVENTION

1. Field of the Invention

The present invention relates to organic nonlinear optical material, in particular, to a novel second-order nonlinear optical polymer and a method for producing the same.

2. Relevant Art

Recently, a technique for producing an optical modulator, frequency transducer, electric-field sensor probe or the like using a poled polymer has been investigated. The term "poled polymer" employed herein means a polymer obtained by poling a transparent polymer, which includes dye materials possessing enhanced second-order nonlinear optical properties.

In regard to the chemical structure of the poled polymer, it is preferable that dye molecules possessing a large second-order molecular hyperpolarizability be chemically bonded to a polymer backbone with a high concentration. The dye materials are generally $\pi$-conjugated dye molecules with donors and acceptors.

The second-order nonlinear optical properties of some dye-attached polymers such as (a) an azo-dye-attached poly(methyl methacrylate) and (b) a stilbene-dye-attached poly(methyl methacrylate) have been reported. (See (a): K. D. Singer et al., *Appl. Phys. Lett.*, 53, 1800 (1988) and (b): G. R. Mohlmann et al., *Synthetic Metals*, 37, 207 (1989)). It has been known that the second-order nonlinear optical constant is increased by increasing the amount of the dye molecules in the polymer. In addition, as a result of an attempt to increase the second-order molecular hyperpolarizability, a dye molecule including a long $\pi$-conjugated chain with a donor and an acceptor, and possessing a large second-order molecular hyperpolarizability has been reported (see J. L. Oudar et al., *J. Chem. Phys.*, 67, 446 (1977)). More concretely, a dye, having a conjugated structure formed of three aromatic rings linked by two azo groups positioned between the aromatic rings, can possess a larger second-order molecular hyperpolarizability, when compared with the stilbene dye or azo dye having two aromatic rings (see M. Amano et al., *J. Appl. Phys.*, 68, 6024 (1990).

However, in regard to the poled polymer, in which dye molecules with long $\pi$-conjugated chains (i.e. with many conjugated aromatic rings) possessing a large second-order molecular hyperpolarizability are bonded to the polymer backbone with a high concentration, there exist disadvantages such as inferior light transparency and poor optical uniformity in film formation. Such disadvantages are due to the fact that a polymer solution for film formation for use in a dip coating or spin coating process is liable to gelation, and for this reason, it is difficult to form a film possessing optical uniformity.

SUMMARY OF THE INVENTION

The objective of the present invention is to provide a second-order nonlinear optical polymer which solves the above mentioned problems in the prior art second-order nonlinear optical polymers. Through the second-order nonlinear optical polymer of the present invention, a film possessing optical uniformity can be formed using the polymer by means of reducing the amount of the gel component generated in a polymer solution for film formation for use in a dip coating or spin coating process.

An aspect of the present invention is directed to providing a second-order nonlinear optical polymer comprising a polymer backbone and side groups bonded to the polymer backbone, wherein the side groups include one or more of a first nonlinear optical group represented by the following formula (C-1) and one or more of a second nonlinear optical group represented by the following formula (C-2) or (C-2)':

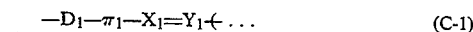
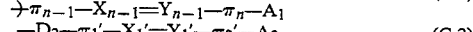
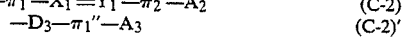

wherein $\pi_1$ to $\pi_n$, $\pi'_1$, $\pi'_2$, and $\pi''_1$ each represent independently a $\pi$-conjugated cyclic compound group; $X_1$ to $X_{n-1}$, $X'_1$, $Y_1$ to $Y_{n-1}$, and $Y'_1$ each represent independently CH, N, or N→O; $A_1$, $A_2$, and $A_3$ each represent independently an electron attracting group; $D_1$, $D_2$, and $D_3$ each represent independently an electron donating group; and n represents an integer of 3 or greater.

Another aspect of the present invention is directed to providing a method for producing a second-order nonlinear optical polymer comprising the steps of:

subjecting (a) (N-ethyl)anilino methacrylate of which one or more hydrogen atoms may be substituted with deuterium atoms, in the amount of (m+n) parts by mole and (b) methyl methacrylate of which one or more hydrogen atoms may be substituted with deuterium atoms, in the amount of (1) parts by mole to a polymerization reaction to form a copolymer having a number average molecular weight of 10,000 to 100,000;

subjecting both (m) parts by mole or more of a compound represented by the following formula (C-16) and (n) parts by mole or more of a compound represented by the following formula (C-17) to a diazotization reaction to form diazonium salts; and subsequently subjecting the copolymer and the diazonium salts to a diazocoupling reaction to produce a second-order nonlinear optical polymer:

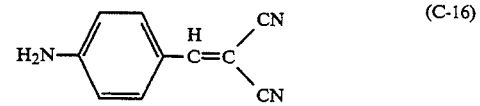

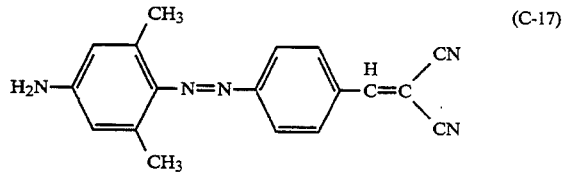

The above objects, effects, features, and advantages of the present invention will become more apparent from the following description of the preferred embodiments thereof.

DETAILED DESCRIPTION OF THE INVENTION

In order to produce an optically uniform polymer film, it is necessary to reduce the amount of a gel component in a polymer solution for film formation. Therefore, an attempt has been carried out (1) to reduce the size of the molecules in the polymer solution and (2) to decrease the possibility of mutual association between the second-order nonlinear optical components. Reduction of the size of the molecules in the polymer solution can be achieved by means of reducing the molecular weight of the polymer and/or reducing the size of the second-order nonlinear optical component possessing a long $\pi$-conjugated chain (i.e. possessing plural conjugated aromatic rings). In addition, in order to decrease the possibility of mutual association between the second-order nonlinear optical components, reduction of the number of molecules of the second-order nonlinear optical component possessing a long $\pi$-conjugated chain per unit volume. However, when the molecular weight of the polymer is reduced, the film formation properties and mechanical properties of the film, as well as the stability of second-order nonlinear optical properties over the passage of time become degraded. In addition, reduction of the size and the number of molecules of the second-order nonlinear optical components leads to a lowering of the second-order nonlinear optical effects.

Therefore, attempts have been made to produce a material which can prevent lowering of second-order nonlinear optical properties, and which has a decreased size of the molecules in the polymer solution without extreme reduction of its molecular weight. Specifically, the material (polymer) according to the present invention is characterized by a copolymer structure wherein both (a) one or more of a first nonlinear optical component (referred to as "long chain component") possessing a large second-order molecular hyperpolarizability and including three or more $\pi$-conjugated rings which are conjugated with one another, as shown in the group represented by formula (C-1), and (b) one or more of a second nonlinear optical component (referred to as "short chain component") including one or two $\pi$-conjugated rings which are conjugated with each other, as shown in the group represented by formula (C-2) or (C-2)', are bonded to a polymer backbone. The short chain components contribute to reducing the size of the molecules in the polymer solution without reducing the molecular weight of the polymer, and when compared with polymer solutions possessing only long chain components, the short chain components prevent gelation in the polymer solution. In addition, since the short chain components suppress the mutual association between the long chain components, the short chain components can also serve to depress gelation in the polymer solution. Furthermore, although the short chain component possesses a smaller second-order molecular hyperpolarizability than the long chain component, the short chain component can greatly prevent reduction of second-order nonlinear optical properties, when compared with the case when these short chain components are excluded.

Therefore, the polymer material according to the present invention can suppress gel generation in the polymer solution by a significantly reducing the size of the molecules in the polymer solution for film formation, without deteriorating the film formation properties, mechanical properties of the film, and second-order nonlinear optical properties over time, in addition to preventing extreme lowering of the second-order nonlinear optical effects. For this reason, according to the present invention, an optically uniform film can be easily produced.

As a solvent employed in film formation there can be mentioned tetrahydrofuran, chlorobenzene, methyl isobutyl ketone, methyl ethyl ketone, Cellosolve ® acetate, chloroform, methylene chloride, N,N-dimethylformamide, dimethyl sulfoxide, or the like.

The polymer according to the present invention possesses the polymer structure as represented by polysiloxane, polymethacrylate, polyester, polyurethane, polyamide, polyimide, polyacrylate, polystyrene, polycarbonate, polyether, derivatives and/or copolymers of the aforementioned, or the like. The nonlinear optical components are bonded to the polymer backbone.

As described above, the second-order nonlinear optical component possesses both an electron attracting group and an electron donating group. As an electron attracting group, there can be mentioned $-NO_2$, $-CN$, $-COOH$, $-COCH_3$, $-CHO$, $-CONH_2$, $-CH=C(CN)_2$, $-C(CN)=C(CN)_2$, a halogen atom or the like. As an electron donating group, there can be mentioned $-SH$, $SR_q$, $-OH$, $-OR_r$, $-NH_2$, $-NR_sR_t$, or the like, [wherein $R_q$, $R_r$, $R_s$, and $R_t$ each represent independently $-(CH_2)_{n'}OH$; $-(CH_2)_{n''}NH_2$; $-(CH_2)_{n'''}SH$ (wherein n', n'', and n''' each represent an integer independently); or an alkyl group; wherein at least one hydrogen of each group described above may be substituted with a deuterium atom; hydrogen atom; or the like, with the proviso that when the second-order nonlinear optical component is bonded to the polymer backbone via the electron donating group, it is preferable that either $R_q$ or $R_r$, and either $R_s$ or $R_t$ have a terminal group such as $-SH$, $-OH$, or $-NH_2$].

According to the present invention, there is provided a second-order nonlinear optical polymer comprising a polymer backbone and side groups bonded to the polymer backbone, wherein the side groups include one or more of a first nonlinear optical group selected from groups represented by the following formulae (C-3), (C-4), and (C-5) and one or more of a second nonlinear optical group selected from groups represented by the following formulae (C-6), (C-7), and (C-8):

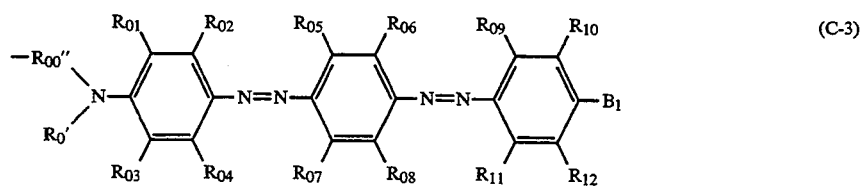

(C-3)

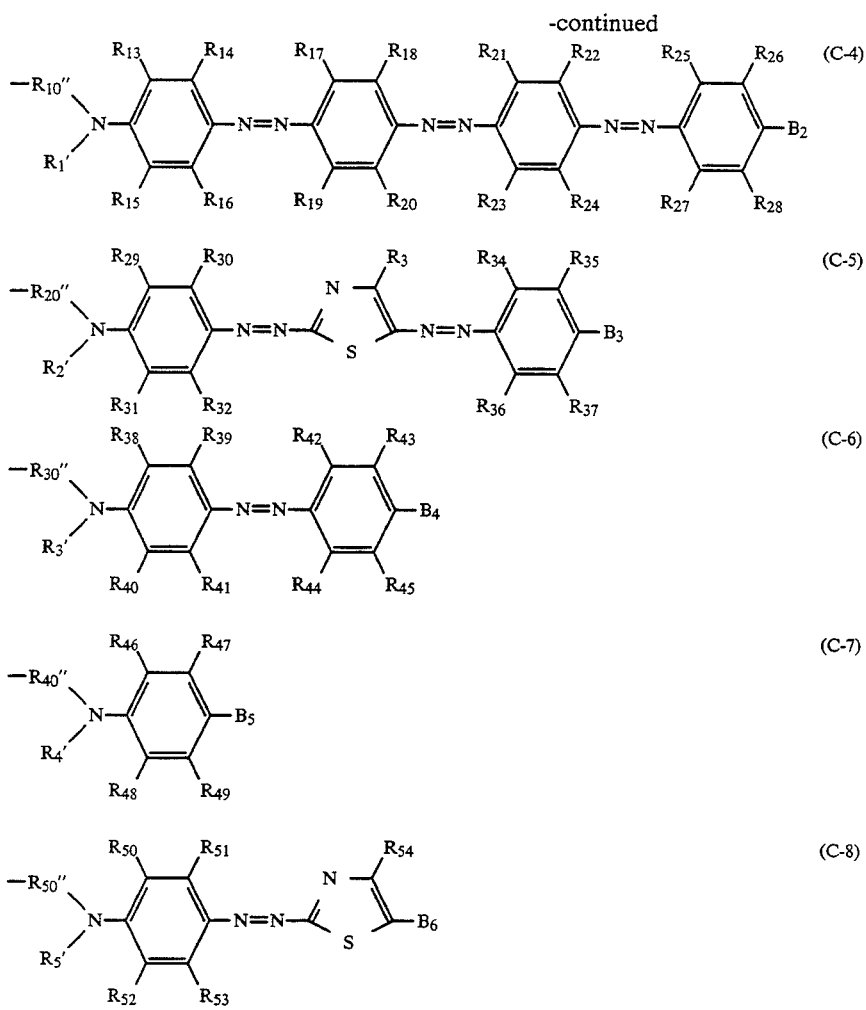

wherein R″₀₀ to R″₅₀ each represent independently an alkylene group shown by the formula: —CH₂(CH₂)$_h$CH₂— wherein h is 0 or an integer, of which one or more hydrogen atoms may be substituted with deuterium atoms; R'₀ to R'₅ each represent independently a first alkylene group shown by the formula: —CH₂(CH₂)$_{h'}$CH₂— wherein h' is 0 or an integer, of which one or more hydrogen atoms may be substituted with deuterium atoms, a second alkylene group represented by the formula: —C$_i$H$_{2i}$ wherein i is an integer, of which one or more hydrogen atoms may be substituted with deuterium atoms, an alkyl group, deuterized alkyl group, substituted alkyl group, substituted deuterized alkyl group, hydrogen atom, deuterium atom, or halogen atom; R₀₁ to R₅₄ each represent independently an alkyl group, deuterized alkyl group, substituted alkyl group, substituted deuterized alkyl group, hydrogen atom, deuterium atom, or halogen atom; and B₁ to B₆ each represent independently an electron attracting group.

In addition, according to the present invention, there is provided a second-order nonlinear optical polymer which includes three units represented by the following formulae (C-9), (C-10), and (C-11), wherein the unit represented by formula (C-11) includes the first nonlinear optical group mentioned above and the unit represented by formula (C-10) includes the second nonlinear optical group mentioned above:

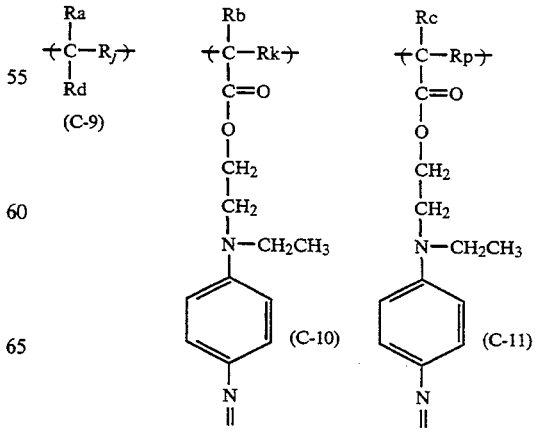

-continued

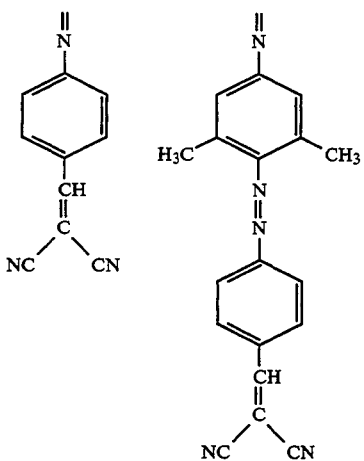

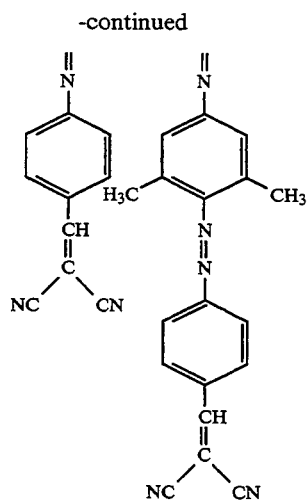

wherein $R_a$ to $R_c$ each represent independently an alkyl group, deuterized alkyl group, substituted alkyl group, substituted deuterized alkyl group, hydrogen atom, deuterium atom, phenyl group, deuterized phenyl group, substituted phenyl group, substituted deuterized phenyl group, or halogen atom; $R_d$ represents a phenyl group, deuterized phenyl group, substituted phenyl group, substituted deuterized phenyl group, halogen atom, —COOR$_e$, or —CONR$_f$R$_g$ [wherein $R_e$, $R_f$, and $R_g$ each represent independently an alkyl group, deuterized alkyl group, substituted alkyl group, substituted deuterized alkyl group, phenyl group, deuterized phenyl group, substituted phenyl group, or substituted deuterized phenyl group]; and $R_j$, $R_k$, and $R_p$ each represent independently a group represented by a formula: —CH$_2$— or —CD$_2$—.

Specially, there is provided a second-order nonlinear optical polymer represented by the following formula (C-12):

$$\text{(C-12)}$$

[Structure showing polymer with three repeating units having CH$_3$ groups, C=O, O-CH$_3$ / O-CH$_2$CH$_2$-N(CH$_2$CH$_3$)-phenyl-N=]

wherein $l_0$, $m_0$, and $n_0$ represent proportions in the range of 80 to 90 mol %, 5 to 10 mol %, and 5 to 10 mol %, respectively, wherein three units are randomly copolymerized and the polymer has a number average molecular weight in a range of 10,000 to 100,000.

This second-order nonlinear optical polymer can be employed in an application utilizing second-order nonlinear optical properties such as an optical switch, optical modulator, wave length transducer, high speed IC diagnosis, printed circuit board diagnosis, or the like, and in particular it is applicable to the printed circuit board diagnosis and high speed IC diagnosis according to an EO sampling process.

The present invention also provides a method for producing a second-order nonlinear optical polymer comprising the steps of:

subjecting a compound represented by the following formula (C-13) in the amount of (m$_1$+n$_1$) parts by mole and a compound represented by the following formula (C-14) in the amount of (l$_1$) parts by mole to a polymerization reaction to form a copolymer represented by the following formula (C-15) having a number average molecular weight of 10,000 to 100,000;

subjecting both (m$_1$) parts by mole or more of a compound represented by formula (C-16) and (n$_1$) parts by mole or more of a compound represented by formula (C-17) to a diazotization reaction to form diazonium salts; and subsequently subjecting the copolymer represented by formula (C-15) and the diazonium salts to a diazocoupling reaction:

(C-13)

[Structure: CH$_3$–C(=CH$_2$)–C(=O)–O–CH$_2$CH$_2$–N(CH$_3$CH$_2$)–phenyl]

-continued

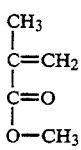 (C-14)

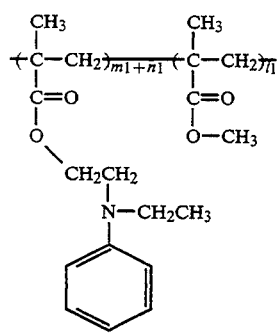 (C-15)

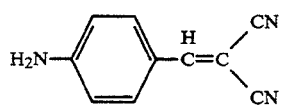 (C-16)

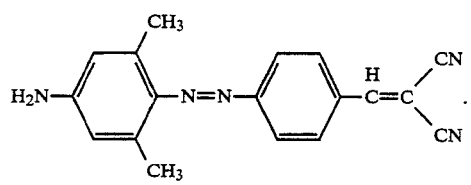 (C-17)

In addition, there is provided a second-order nonlinear optical polymer represented by the following formula (C-18):

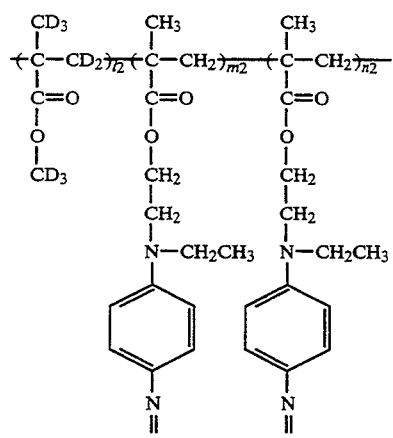 (C-18)

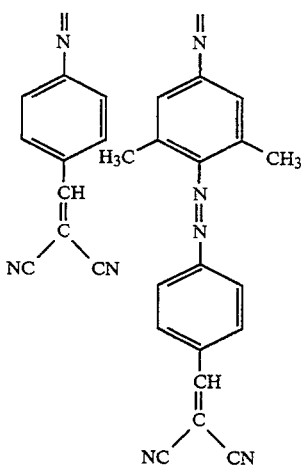

wherein $l_2$, $m_2$, and $n_2$ represent proportions in the range of 80 to 90 mol %, 5 to 10 mol %, and 5 to 10 mol %, respectively, wherein three units are randomly co-polymerized and the polymer has a number average molecular weight in the range of 10,000 to 100,000.

This second-order nonlinear optical polymer can be employed in an application utilizing second-order nonlinear optical properties such as an optical switch, optical modulator, wave length transducer, high speed IC diagnosis, printed circuit board diagnosis, or the like, and in particular it can be employed as an optical waveguide possessing an electro-optic effect in an optical communication system.

According to the present invention, the polymer is produced by a method for producing a second-order nonlinear optical polymer comprising the steps of:

subjecting a compound represented by formula (C-13) in the amount of $(m_3+n_3)$ parts by mole and a compound represented by the following formula (C-19) in the amount of $(l_3)$ parts by mole to a polymerization reaction to form a copolymer represented by the following formula (C-20) having a number average molecular weight of 10,000 to 100,000;

subjecting both $(m_3)$ parts by mole or more of a compound represented by formula (C-16) and $(n_3)$ parts by mole or more of a compound represented by formula (C-17) to a diazotization reaction to form diazonium salts; and subsequently subjecting the copolymer represented by formula (C-20) and the diazonium salts to a diazocoupling reaction:

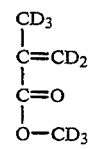 (C-19)

-continued

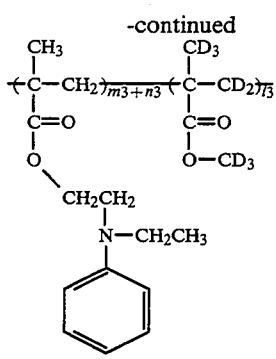
(C-20)

Furthermore, there is provided a second-order nonlinear optical polymer represented by the following formula (C-21):

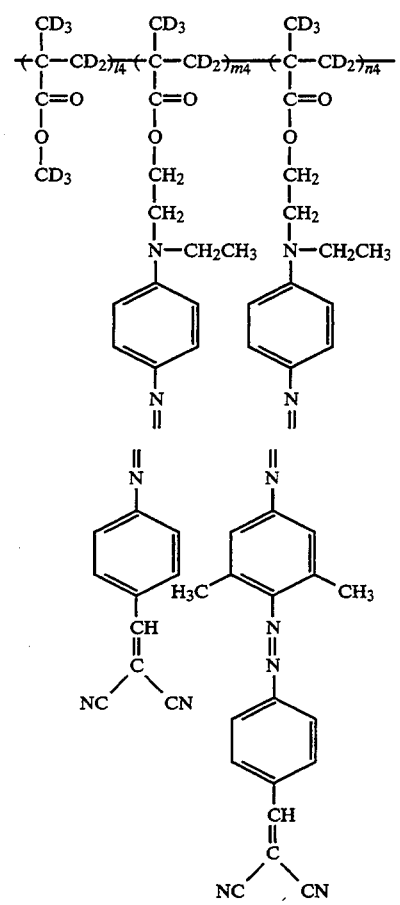
(C-21)

wherein $l_4$, $m_4$, and $n_4$ represent proportions in the range of 80 to 90 mol %, 5 to 10 mol %, and 5 to 10 mol %, respectively, wherein three units are randomly copolymerized and the polymer has a number average molecular weight in the range of 10,000 to 100,000.

In this second-order nonlinear optical polymer, some hydrogen atoms in the polymer molecule are substituted with deuterium atoms. For this reason, it is predicted that the polymer possesses an extremely low absorption loss at a wave length of approximately 1.3 μm. The polymer material can also be employed in an application utilizing second-order nonlinear optical properties such as an optical switch, optical modulator, wave length transducer, high speed IC diagnosis, printed circuit board diagnosis, or the like, and in particular it can be employed as an optical waveguide possessing an electro-optic effect in an optical communication system.

The present invention also provides a method for producing a second-order nonlinear optical polymer comprising the steps of:

subjecting a compound represented by the following formula (C-22) in the amount of ($m_5$ + $n_5$) parts by mole and a compound represented by formula (C-19) in the amount of ($l_5$) parts by mole to a polymerization reaction to form a copolymer represented by the following formula (C-23) having a number average molecular weight of 10,000 to 100,000;

subjecting both ($m_5$) parts by mole or more of a compound represented by formula (C-16) and ($n_5$) parts by mole or more of a compound represented by formula (C-17) to a diazotization reaction to form diazonium salts; and subsequently subjecting the copolymer represented by formula (C-23) and the diazonium salts to a diazocoupling reaction:

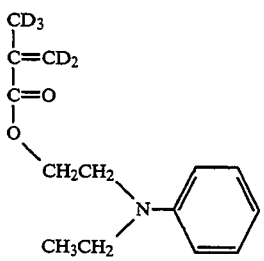
(C-22)

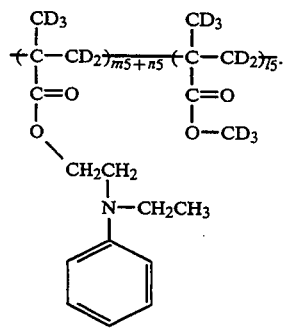
(C-23)

It is required that the polymer has a noncentrosymmetric structure in order to exhibit the second-order nonlinear properties. The noncentrosymmetric structure can be usually attained by electric-poling the polymer material in a softened or fluid state using either (1) electrodes (by applying a DC voltage to the polymer with electrodes) or (2) a corona discharge (by utilizing electric charges obtained by a corona discharge). It is preferable that the polymer material be hardened by either cooling or thermosetting the material under an applied electric field or under charging.

The nonlinear optical polymer according to the present invention is possible to be employed as a third-order nonlinear optical material. In this case, it is not necessary to subject the polymer material to the poling treatment described above.

EXAMPLE
Example 1
A polymer compound represented by formula (C-24) was synthesized.
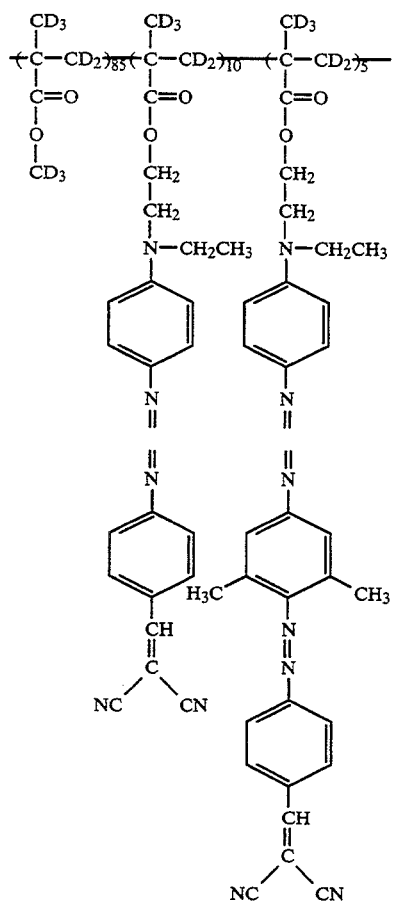
The synthesis of this polymer compound was carried out as follows:
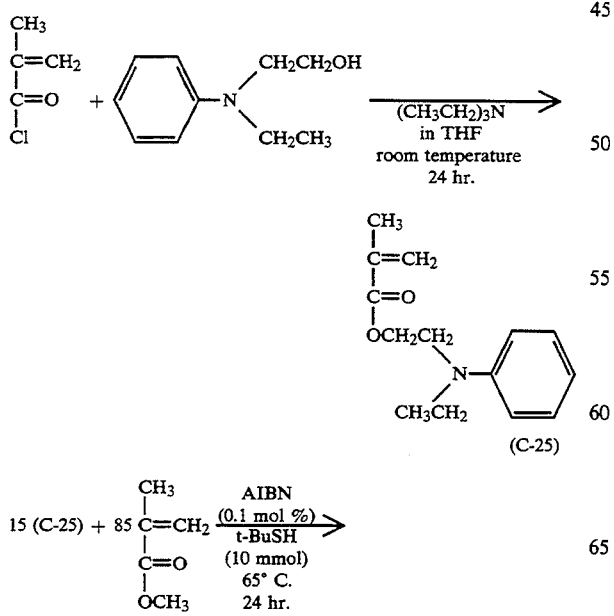
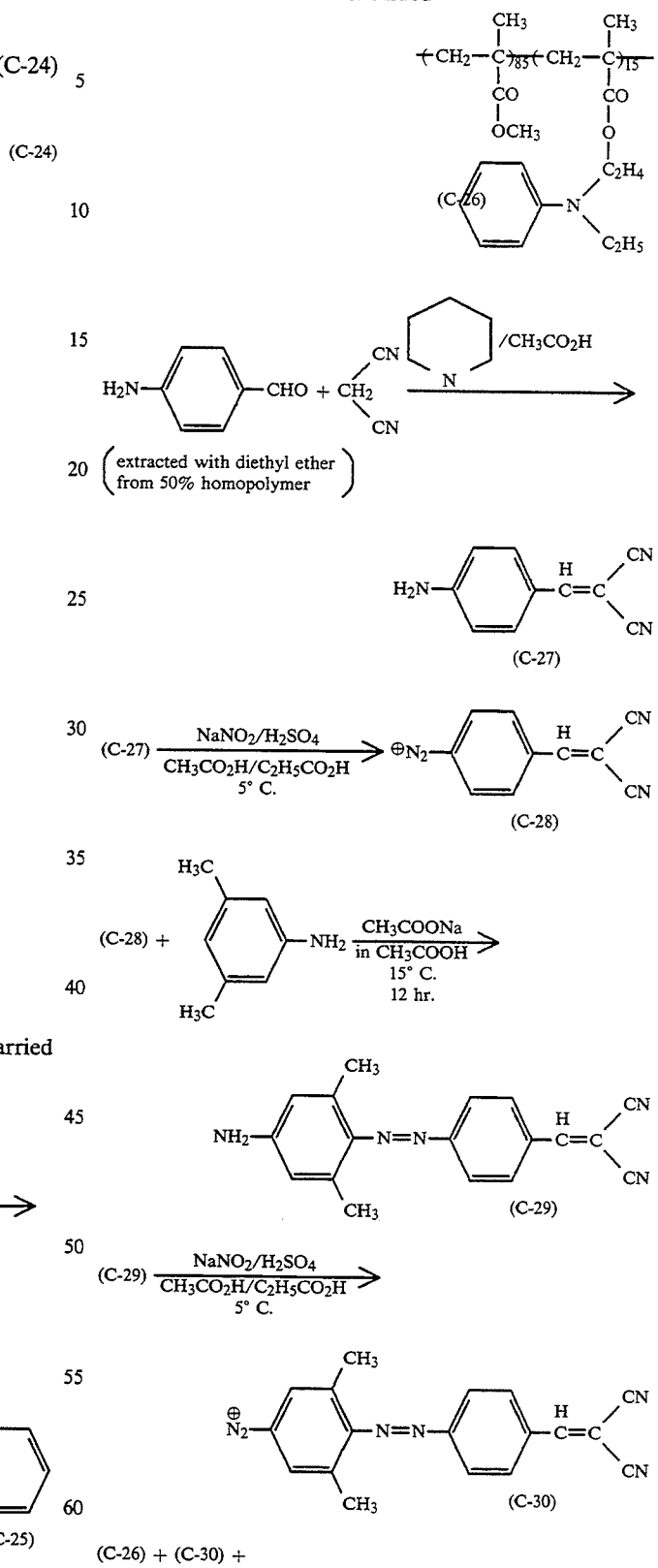
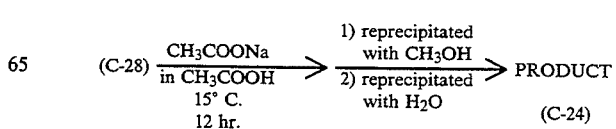

Synthesis of Compound (C-26)

157 g of (N-ethyl)anilinoethanol was dissolved in 1000 cc of tetrahydrofuran, which had been dried overnight using a molecular sieve, and then dried over anhydrous magnesium sulfate. This was then added with 360 g of triethylamine to a three-mouth flask equipped with a calcium chloride tube, dropping funnel and reflux condenser, and methacryloyl chloride containing a stabilizing agent was then added dropwise over the course of over an hour while stirring. The mixture was allowed to react at room temperature for 24 hours and then heated under reflux for an additional hour. Following this reaction, the reaction mixture was poured into 2000 cc of water and the excess triethylamine was neutralized using hydrochloric acid. The crude product was further extracted with 2000 cc of diethyl ether. This extract was washed first with an aqueous solution of sodium bicarbonate and then with distilled water, and following drying over magnesium sulfate, the ether was removed to yield product (C-25).

29 g of this compound (C-25) was subsequently mixed with 71 g of methyl methacrylate, and 0.14 g of azobis(isobutyronitrile), corresponding to 0.1% by mole of the above mixture, and 0.44 µl of t-butylmercaptan were then added thereto as the initiator and the chain transfer agent respectively. The dissolved oxygen was then removed by repeating three times the processes of freezing-deairing-dissolving in ampoule and a vacuum was created. This was followed by polymerization of the mixture for 24 hours at 65° C. Following this reaction, the polymer compound was dissolved in 5000 cc of acetic acid, and after the undissolved portion was filtered, reprecipitation was performed using 25,000 cc of methanol to yield compound (C-26). The methyl methacrylate component within this compound (C-26) was at 85% by mole according to an NMR measurment.

The compound (C-26) had a number average molecular weight of 75,000.

Synthesis of Compound (C-27)

To a three-mouth flask equipped with a calcium chloride tube, dropping funnel and reflux condenser, 20 g (incorporating 50% homopolymer) of p-aminobenzaldehyde monomer (produced by Tokyo Kasei Co., Ltd.), 5.5 g of malononitrile (produced by Tokyo Kasei Co., Ltd.) and 500 cc of anhydrous ethanol (dried using a molecular sieve) were added and stirred to yield a suspension. Next, a solution of 2.0 cc of piperidine (produced by Tokyo Kasei Co., Ltd.) dissolved in 7 cc of acetic acid was added dropwise, and the mixture was heated under reflux for 2 hours. Following this reaction, the ethanol was removed, and the reactant was extracted using diethyl ether. The portions undissolved (the unreacted components) in diethyl ether were then removed, and the ether-extracted component was recrystallized from ethanol to yield (38% yield) compound (C-27).

Synthesis of Compound (C-28)

20 g of compound (C-27) was heat-dissolved in a mixture containing 500 cc of acetic acid and 50 cc of propionic acid, and was then cooled to a temperature of 5° C. or less. To 100 cc of sulfuric acid, 8.9 g of sodium nitrite was then added gradually, taking care so that heat was not generated. This was then added dropwise to the solution of compound (C-27), while taking care so as to not allow the liquid temperature to exceed 10° C., yielding compound (C-28). The reaction liquid was then cooled to a temperature of 5° C. or less and preserved at the same temperature.

Synthesis of Compound (C-29)

While chilling the aforementioned reaction liquid of compound (C-28) at approximately 5° C. 16 g of 3,5-xylidine and 300 g of sodium acetate trihydrate were added. The reaction mixture immediately turned a concentrated red color. After stirring the reaction mixture at approximately 15° C. for a few hours, it was allowed to react for an additional 12 hours at room temperature. Following this reaction, 2000 cc of water was added and the reaction product was precipitated out. This precipitated product was then dried sufficiently in a vacuum, and further purified using a silica gel column (eluting with methylene chloride).

Synthesis of Compound (C-30)

2.1 g of compound (C-29) was heat-dissolved in a mixture containing 100 cc of acetic acid and 10 cc of propionic acid, and the resultant mixture was cooled to a temperature of 5° C. or less. Subsequently, to 20 cc of sulfuric acid, 0.53 g of sodium nitrite was added gradually, taking care so that heat was not generated. This was then added dropwise to the solution of compound (C-29), while taking care so as to not allow the liquid temperature to exceed 10° C., yielding compound (C-30). The reaction liquid was then cooled to a temperature of 5° C. or less and preserved at the same temperature.

Synthesis of Compound (C-24)

17 g of compound (C-26) was dissolved in 500 cc of acetic acid and maintained at 15° C. or less. Using a solution of compound (C-30) and 2.4 g of compound (C-27) as starting materials, a solution of compound (C-28) synthesized above, and 150 g of sodium acetate hydrate were added and then stirred for 24 hours at room temperature. Following the reaction, the solids were filtered off, and the filtrate was reprecipitated from 5000 cc of methanol. The precipitate was then dissolved in 500 cc of acetic acid, the undissolved portions were filtered off, and the filtrate obtained was reprecipitated from 5000 cc of water.

The resultant polymer compound (C-24) was dissolved in chlorobenzene to form a 20% by weight solution. The gel component present in small amounts in this polymer solution was filtered (differential pressure of 1 kg/cm$^2$) using a filter with a 1.0 µm mesh, and easily removed. From this solution, an optically uniform film of thickness 20 µm or more was formed by means of either a spin coating process or a doctor blade process. Control of the film thickness was possible in the doctor blade process by means of regulating the space between the blade and the substrate, and in the spin coating process by means of regulating the concentration of the polymer solution or the rotating speed of the spin coater. For example, when a 13% by weight solution was spin coated at a speed of 1000 rpm, a film of thickness 10 µm was obtained.

Electrodes were then positioned above and below the resultant film, and a voltage of 2.0 MV/cm was applied in an environment of 140° C. While continually applying the voltage, the system was cooled to room temperature, resulting in a film with an electro-optic constant of 45 pm/V at a wavelength of 1.3 µm.

The transmittance of a film of thickness 10 μm at a wavelength of 1.3 μm was 99% or greater.

Example 2

A polymer compound represented by formula (C-32) was synthesized.

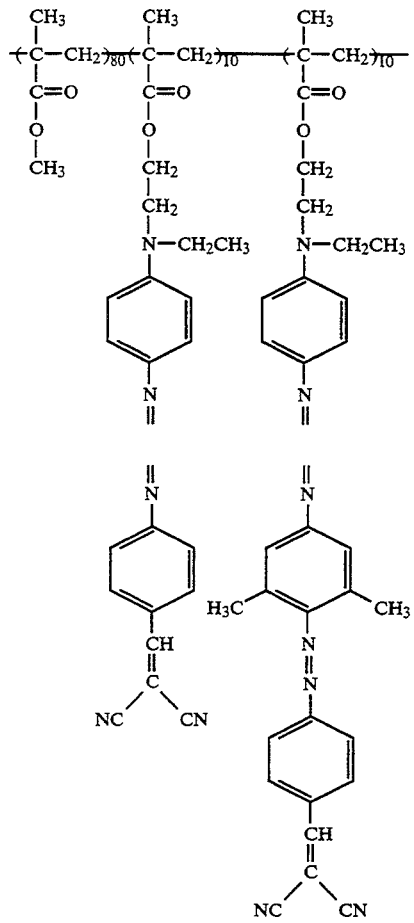

The compound (C-43) had a number average molecular weight of 80,000.

The synthesis of the polymer compound was carried out as follows:

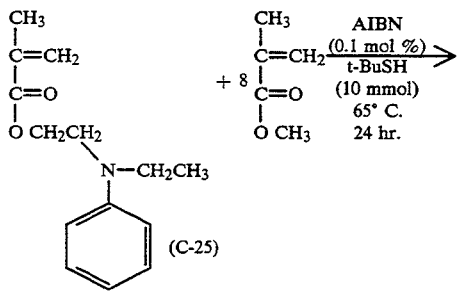

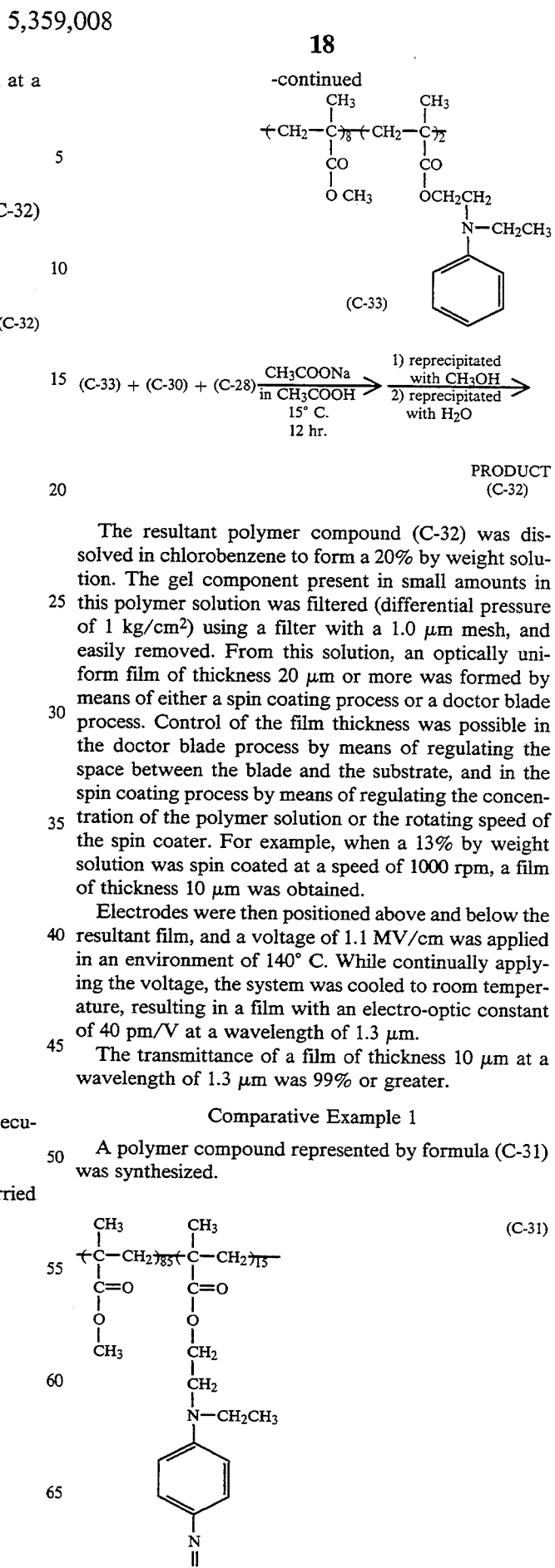

The resultant polymer compound (C-32) was dissolved in chlorobenzene to form a 20% by weight solution. The gel component present in small amounts in this polymer solution was filtered (differential pressure of 1 kg/cm²) using a filter with a 1.0 μm mesh, and easily removed. From this solution, an optically uniform film of thickness 20 μm or more was formed by means of either a spin coating process or a doctor blade process. Control of the film thickness was possible in the doctor blade process by means of regulating the space between the blade and the substrate, and in the spin coating process by means of regulating the concentration of the polymer solution or the rotating speed of the spin coater. For example, when a 13% by weight solution was spin coated at a speed of 1000 rpm, a film of thickness 10 μm was obtained.

Electrodes were then positioned above and below the resultant film, and a voltage of 1.1 MV/cm was applied in an environment of 140° C. While continually applying the voltage, the system was cooled to room temperature, resulting in a film with an electro-optic constant of 40 pm/V at a wavelength of 1.3 μm.

The transmittance of a film of thickness 10 μm at a wavelength of 1.3 μm was 99% or greater.

Comparative Example 1

A polymer compound represented by formula (C-31) was synthesized.

-continued

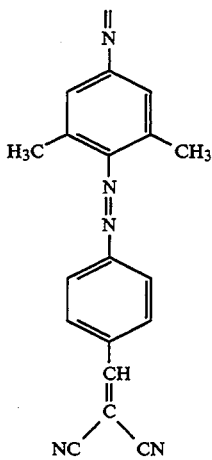

The polymer compound (C-31) had a number average molecular weight of 80,000.

The synthesis of the polymer compound (C-31) was carried out using the compound (C-26) and the compound (C-30) according to the synthetic procedure described in Example 1.

The resultant polymer compound (C-31) was liable to gelation in chlorobenzene. For this reason, it was difficult to filter the polymer compound (C-31) in chlorobenzene using a filter with a 5.0 μm mesh. Therefore, the polymer compound (C-31) in chlorobenzene was filtered using a filter with a 10.0 μm mesh to obtain a polymer solution. From this polymer solution, an optically uniform film was not able to be formed by means of a spin coating process. The transmittance of a film of thickness 10 μm at a wavelength of 1.3 μm was 70% or smaller.

Example 3

A polymer compound represented by formula (C-35) was synthesized.

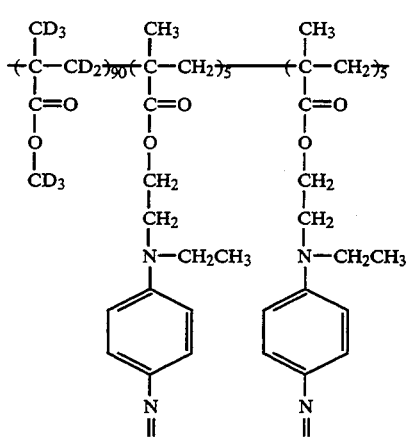

-continued

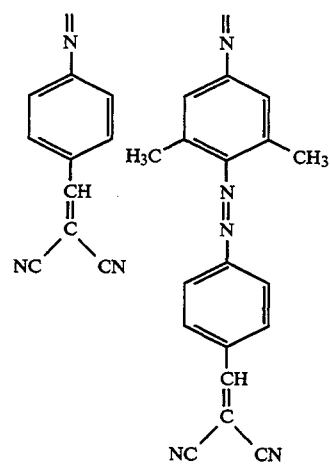

The polymer compound (C-35) had a number average molecular weight of 75,000.

The synthesis of this polymer compound was carried out as follows:

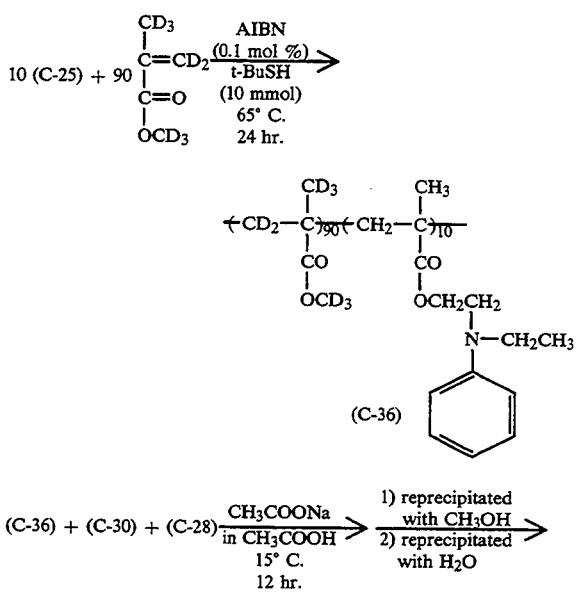

The resultant polymer compound (C-35) was dissolved in chlorobenzene to form a 20% by weight solution. The gel component present in small amounts in this polymer solution was filtered (differential pressure of 1 kg/cm$^2$) using a filter with a 0.5 μm mesh, and easily removed. From this polymer solution, an optically uniform film of thickness 20 μm or more was formed by means of either a spin coating process or a doctor blade process. Control of the film thickness was possible in the doctor blade process by means of regulating the space between the blade and the substrate, and in the spin coating process by means of regulating the concentration of the high polymer solution or the rotating speed of the spin coater. For example, when a 13% by weight solution was spin coated at a speed of 1500 rpm, a film of thickness 5 μm was obtained.

Electrodes were then positioned above and below the resultant film, and a voltage of 2.0 MV/cm was applied in an environment of 140° C. While continually applying the voltage, the system was cooled to room temperature, resulting in a film with an electro-optic constant of 40 pm/V at a wavelength of 1.3 μm.

A film of thickness 5 μm was processed using an oxygen plasma etching process to produce an optical waveguide having a width of 5 μm. As a cladding of the waveguide, an epoxy resin was employed. The optical loss of the optical waveguide was 0.7 dB/cm at a wavelength of 1.3 μm.

Comparative Example 2

A polymer compound represented by formula (C-37) was synthesized.

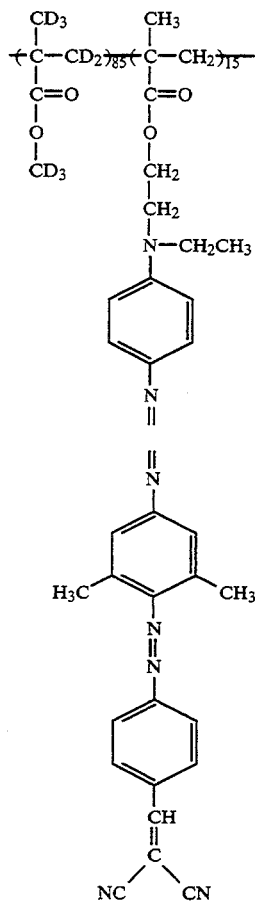

The polymer compound (C-37) had a number average molecular weight of 75,000.

The synthesis of the polymer compound (C-37) was carried out according to the synthetic procedure described in Example 3.

The resultant polymer compound (C-37) was liable to gelation in chlorobenzene. For this reason, it was difficult to filter the polymer compound (C-37) in chlorobenzene using a filter with a 5.0 μm mesh. Therefore, the polymer compound (C-37) in chlorobenzene was filtered using a filter with a 10.0 μm mesh to obtain a polymer solution. From this polymer solution, a film was produced by a spin coating process. Using this film, an optical waveguide was manufactured according to the same procedure described described in Example 3.

The optical loss of the optical waveguide was 10 dB/cm at a wavelength of 1.3 μm.

Example 4

A polymer compound represented by formula (C-38) was synthesized.

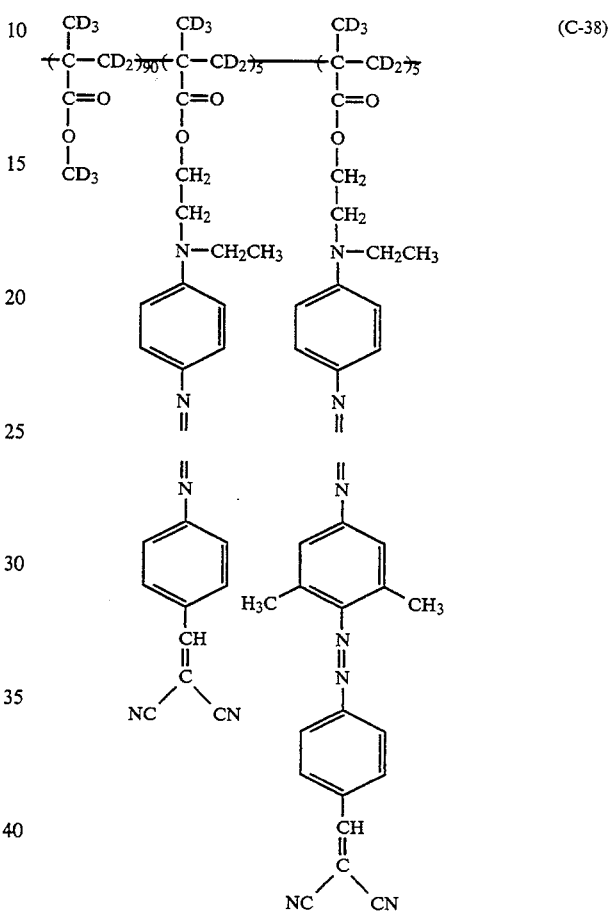

The compound (C-38) had a number average molecular weight of 75,000.

The synthesis of this polymer compound was carried out as follows:

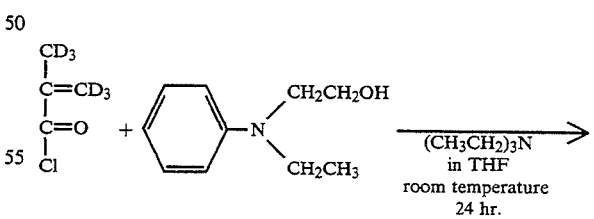

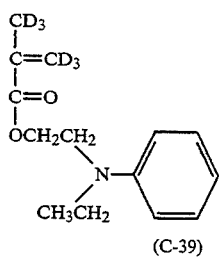

(C-39)

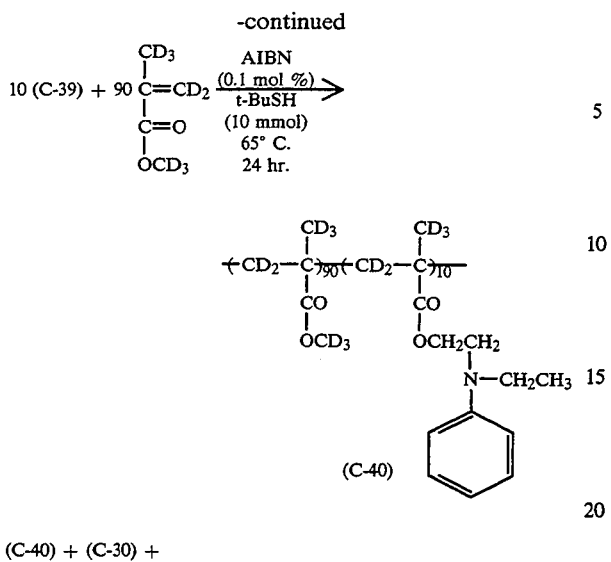

(C-40) + (C-30) +

(C-28) $\xrightarrow[\substack{15° \text{ C.} \\ 12 \text{ hr.}}]{\substack{\text{CH}_3\text{COONa} \\ \text{in CH}_3\text{COOH}}}$ $\xrightarrow[\substack{2) \text{ reprecipitated} \\ \text{with H}_2\text{O}}]{\substack{1) \text{ reprecipitated} \\ \text{with CH}_3\text{OH}}}$ PRODUCT (C-38)

The resultant polymer compound (C-38) was dissolved in chlorobenzene to form a 20% by weight solution. The gel component present in small amounts in this polymer solution was filtered (differential pressure of 1 kg/cm$^2$) using a filter with a 0.5 μm mesh, and easily removed. From this polymer solution, an optically uniform film of thickness 20 μm or more was formed by means of either a spin coating process or a doctor blade process. Control of the film thickness was possible in the doctor blade process by means of regulating the space between the blade and the substrate, and in the spin coating process by means of regulating the concentration of the high polymer solution or the rotating speed of the spin coater. For example, when a 13% by weight solution was spin coated at a speed of 1500 rpm, a film of thickness 5 μm was obtained.

Electrodes were then positioned above and below the resultant film, and a voltage of 2.0 MV/cm was applied in an environment of 140° C. While continually applying the voltage, the system was cooled to room temperature, resulting in a film with an electro-optic constant of 40 pm/V at a wavelength of 1.3 μm.

A film of thickness 5 μm was processed using an oxygen plasma etching process to produce an optical waveguide having a width of 5 μm. The optical loss of the optical waveguide was 0.3 dB/cm at a wavelength of 1.3 μm.

Comparative Example 3

A polymer compound represented by formula (C-45) was synthesized.

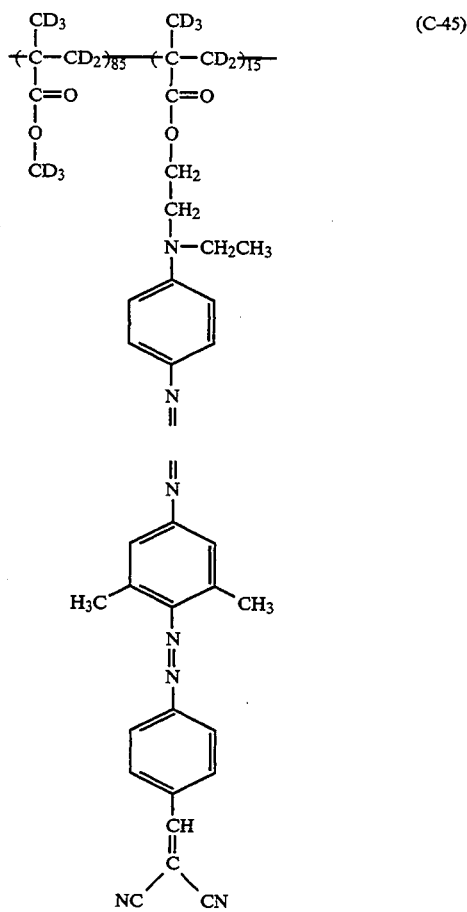

The polymer compound (C-45) had a number average molecular weight of 75,000.

The synthesis of this polymer compound (C-45) was carried out according to the synthetic procedure described in Example 4.

The resultant polymer compound (C-45) was liable to gelation in chlorobenzene. For this reason, it was difficult to filter the polymer compound (C-45) in chlorobenzene using a filter with a 5.0 μm mesh. Therefore, the polymer compound (C-45) in chlorobenzene was filtered using a filter with a 10.0μm mesh to obtain a polymer solution. From this polymer solution, a film was produced by a spin coating process. Using this film, an optical waveguide was manufactured according to the procedure described described in Example 3. The optical loss of the optical waveguide was 10 dB/cm or more at a wavelength of 1.3 μm.

Example 5

A polymer compound represented by formula (C-46) was synthesized.

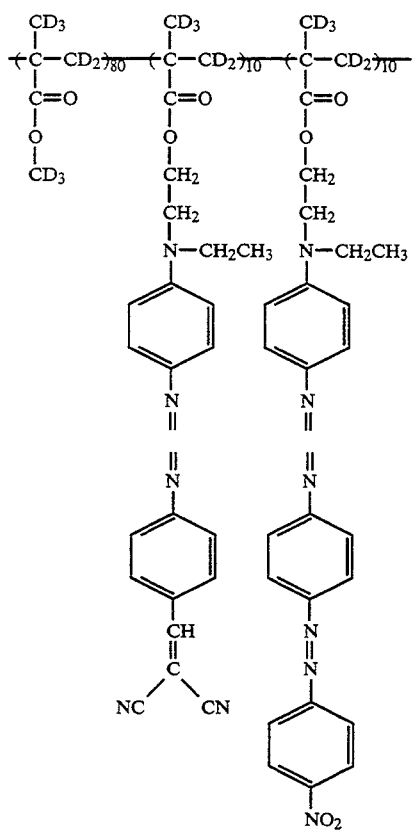

(C-46)

The polymer compound (C-46) had a number average molecular weight of 70,000.

The synthesis of the polymer compound was carried out according to the synthetic procedure described in Example 1 using a compound represented by the formula:

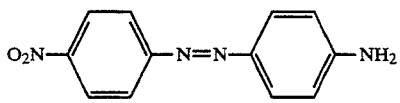

instead of the compound (C-29) employed in Example 1.

The resultant polymer compound (C-46) was dissolved in chlorobenzene to form a 20% by weight solution. The gel component present in small amounts in this polymer solution was filtered (differential pressure of 1 kg/cm$^2$) using a filter with a 0.5 μm mesh, and easily removed. From this polymer solution, an optically uniform film of thickness 20 μm or more was formed by means of either a spin coating process or a doctor blade process. Control of the film thickness was possible in the doctor blade process by means of regulating the space between the blade and the substrate, and in the spin coating process by means of regulating the concentration of the high polymer solution or the rotating speed of the spin coater. For example, when a 13% by weight solution was spin coated at a speed of 1500 rpm, a film of thickness 5 μm was obtained.

Electrodes were then positioned above and below the resultant film, and a voltage of 2.0 MV/cm was applied in an environment of 140° C. While continually applying the voltage, the system was cooled to room temperature, resulting in a film with an electro-optic constant of 50 pm/V at a wavelength of 1.3 μm.

A film of thickness 5 μm was processed using an oxygen plasma etching process to produce an optical waveguide having a width of 5 μm. As a cladding of the waveguide, an epoxy resin was employed. The optical loss of the optical waveguide was 0.5 dB/cm at a wavelength of 1.3 μm.

Comparative Example 4

A polymer compound represented by formula (C-47) was synthesized.

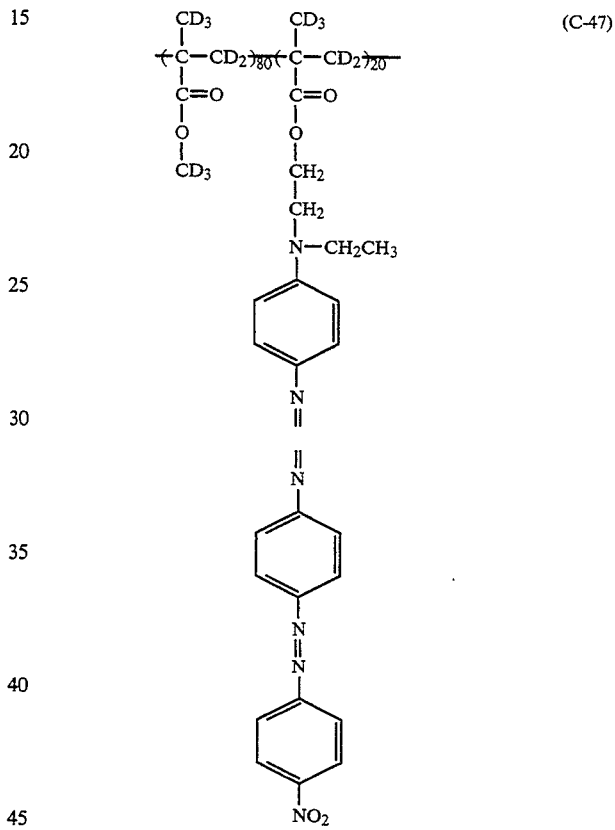

(C-47)

The polymer compound (C-47) had a number average molecular weight of 70,000.

The synthesis of the polymer compound (C-47) was carried out according to the synthetic procedure described in Example 1.

The resultant polymer compound (C-47) was liable to gelation in chlorobenzene. For this reason, it was difficult to filter the polymer compound (C-47) in chlorobenzene using a filter with a 5.0 μm mesh. Therefore, the polymer compound (C-47) in chlorobenzene was filtered using a filter with a 10.0 μm mesh to obtain a polymer solution. From this polymer solution, a film was produced by a spin coating process. Using this film, an optical waveguide was manufactured according to the procedure described described in Example 3. The optical loss of the optical waveguide was 10 dB/cm at a wavelength of 1.3 μm.

Example 6

A polymer compound represented by formula (C-48) was synthesized.

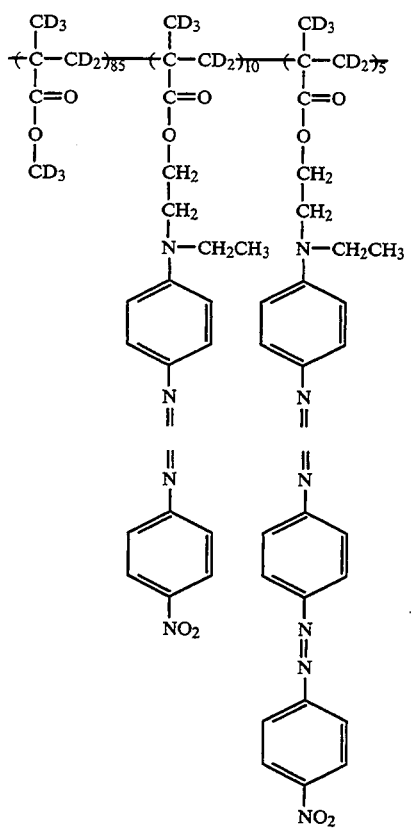

(C-48)

The synthesis of this polymer compound was carried out according to the procedure described shown in Example 1 using a compound represented by the formula:

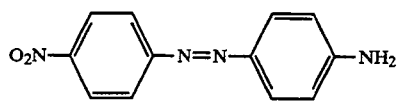

instead of the compound (C-29) employed in Example 1 and 4-nitroaniline instead of the compound (C-27) employed in Example 1.

The resultant polymer compound (C-48) was dissolved in chlorobenzene to form a 20% by weight solution. The gel component present in small amounts in this polymer solution was filtered (differential pressure of 1 kg/cm²) using a filter with a 0.1 μm mesh, and easily removed. From this polymer solution, an optically uniform film of thickness 20 μm or more was formed by means of either a spin coating process or a doctor blade process. Control of the film thickness was possible in the doctor blade process by means of regulating the space between the blade and the substrate, and in the spin coating process by means of regulating the concentration of the high polymer solution or the rotating speed of the spin coater. For example, when a 13% by weight solution was spin coated at a speed of 1500 rpm, a film of thickness 5 μm was obtained.

Electrodes were then positioned above and below the resultant film, and a voltage of 2.0 MV/cm was applied in an environment of 140° C. While continually applying the voltage, the system was cooled to room temperature, resulting in a film with an electro-optic constant of 38 pm/V at a wavelength of 1.3 μm.

A film of thickness 5 μm was processed using an oxygen plasma etching process to produce an optical waveguide having a width of 5 μm. As a cladding of the waveguide, an epoxy resin was employed. The optical loss of the optical waveguide was 0.3 dB/cm at a wavelength of 1.3 μm.

Comparative Example 5

A polymer compound represented by formula (C-49) was synthesized.

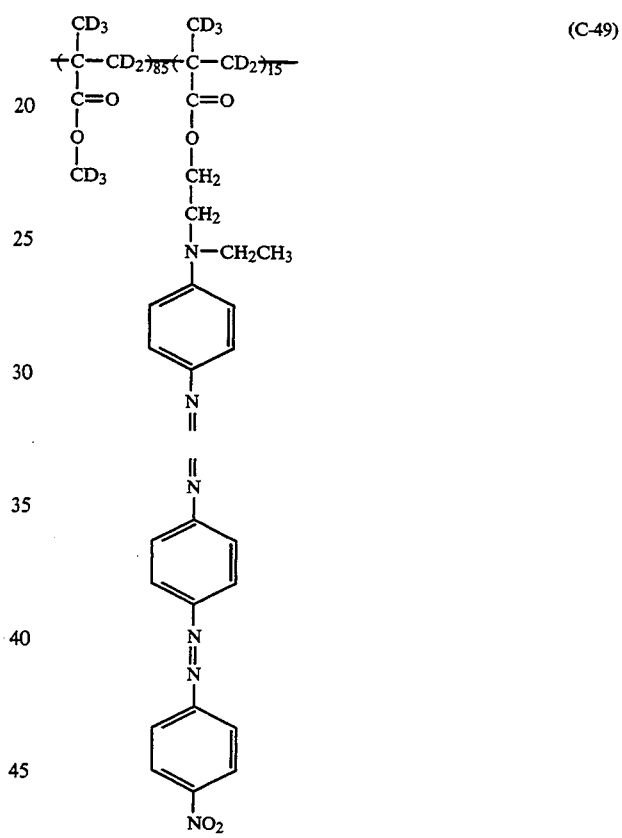

The synthesis of the polymer compound (C-49) was carried out according to the synthetic procedure described in Example 6.

The resultant polymer compound (C-49) was liable to gelation in chlorobenzene. For this reason, it was difficult to filter the polymer compound in chlorobenzene using a filter with a 5.0μm mesh. Therefore, the polymer compound was filtered using a filter with a 10.0 μm mesh to obtain a polymer solution. From this polymer solution, a film was produced by a spin coating process. Using this film, an optical waveguide was manufactured according to the procedure described described in Example 3. The optical loss of the optical waveguide was 10 dB/cm or more at a wavelength of 1.3 μm.

Example 7

A polymer compound represented by formula (C-50) was synthesized.

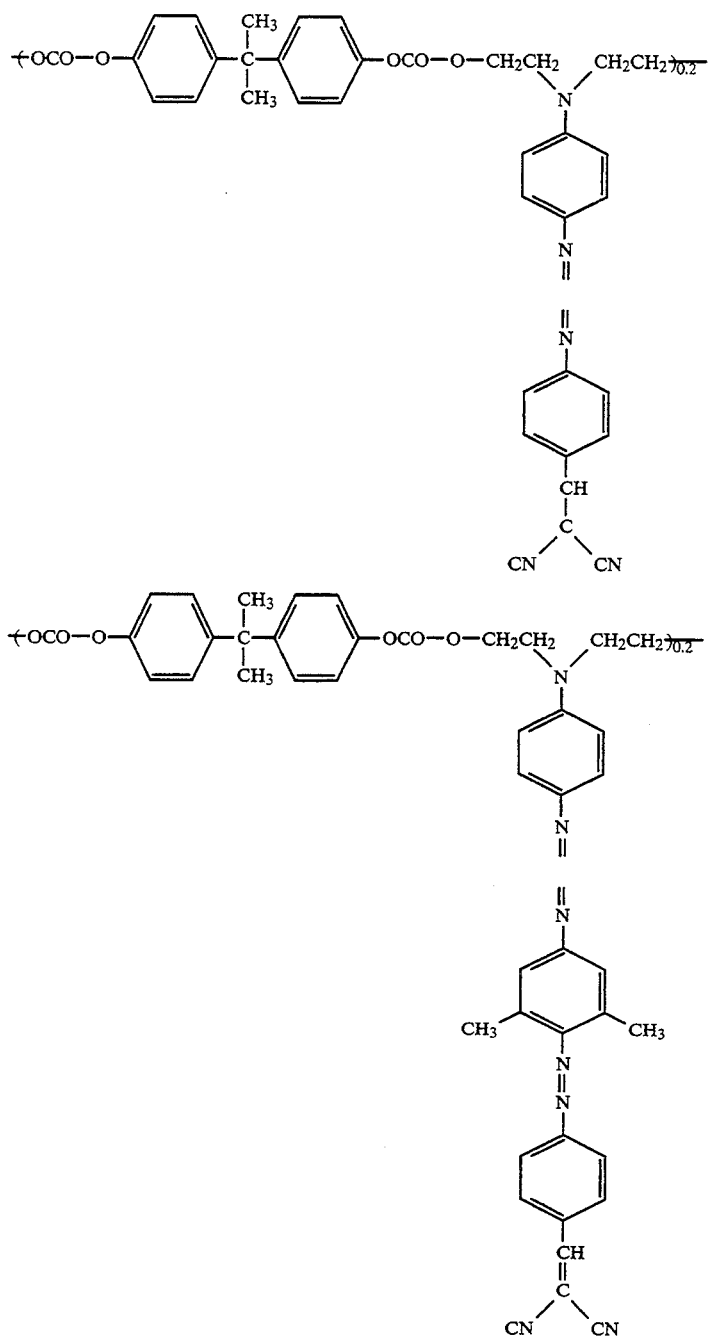
(C-50)
The synthesis of this polymer compound was carried out as follows:
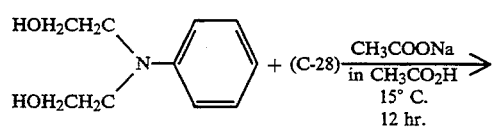

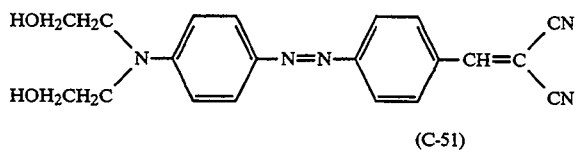
(C-51)

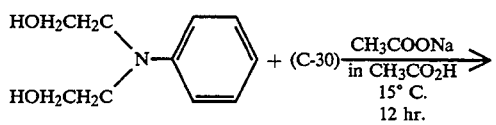

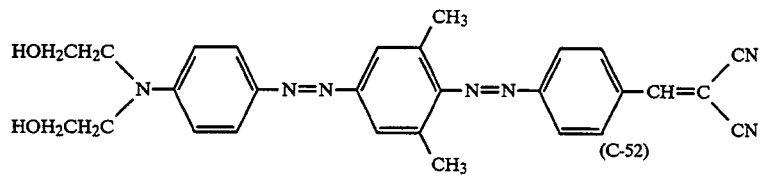
(C-52)

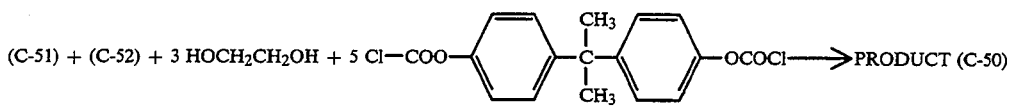

The resultant polymer compound was dissolved in chlorobenzene to form a 18% by weight solution. The gel component present in small amounts in this polymer solution was filtered (differential pressure of 1 kg/cm$^2$) using a filter with a 1.0 μm mesh, and easily removed. From this solution, an optically uniform film of thickness 20 μm or more was formed by means of either a spin coating process or a doctor blade process. Control of the film thickness was possible in the doctor blade process by means of regulating the space between the blade and the substrate, and in the spin coating process by means of regulating the concentration of the high polymer solution or the rotating speed of the spin coater. For example, when a 11% by weight solution was spin coated at a speed of 1000 rpm, a film of thickness 6 μm was obtained.

Electrodes were then positioned above and below the resultant film, and a voltage of 1.5 MV/cm was applied in an environment Of 140° C. While continually applying the voltage, the system was cooled to room temperature, resulting in a film with an electro-optic constant of 61 pm/V at a wavelength of 1.3 μm.

The transmittance of a film of thickness 10 μm at a wavelength of 1.3 μm was 99% or greater.

Comparative Example 6

A polymer compound represented by formula (C-53) was synthesized.

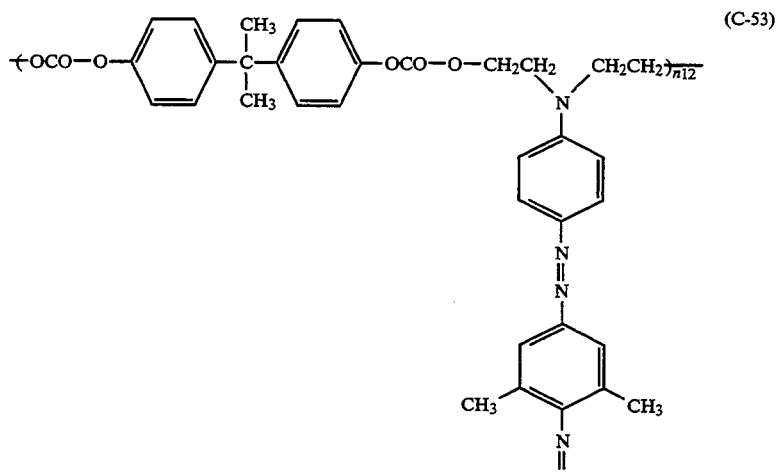
(C-53)

-continued

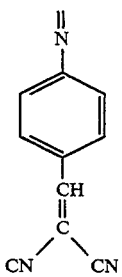

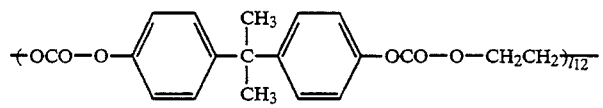

When the polymer compound represented by formula (C-53) possessed 0.9 of $l_{12}$ and 0.1 of $n_{12}$, this polymer compound afforded to form a film which was similar to that obtained in Example 7. However, when the film was poled under the same conditions as described in Example 7, the poled film possessed an electro-optic constant of 18 pm/V.

Furthermore, when the polymer compound represented by formula (C-53) possessed 0.6 of $l_{12}$ and 0.4 of $n_{12}$, from this polymer compound a polymer solution could not be formed due to gelation. For this reason, film formation could not be achieved using this polymer compound.

Example 8

A polymer compound represented by formula (C-54) was synthesized.

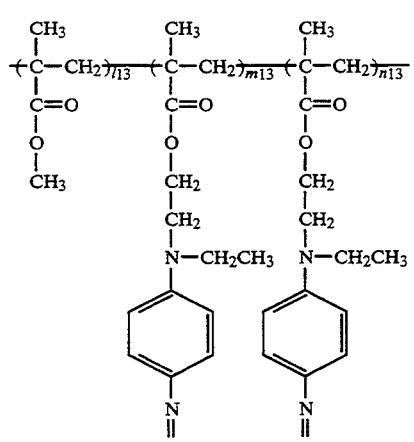 (C-54)

-continued

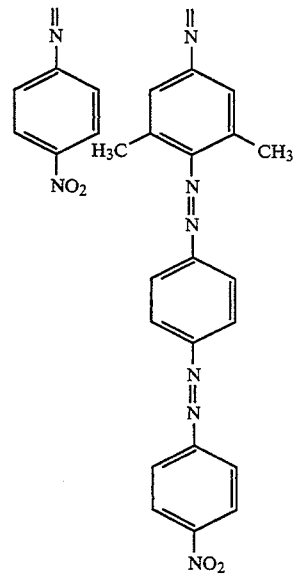

($l_{13}/m_{13}/n_{13} = 85/10/5$)

The synthesis of the polymer compound was carried out as follows:

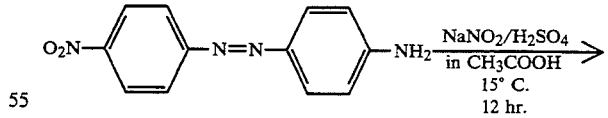

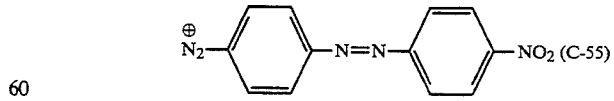 (C-55)

(C-55) + 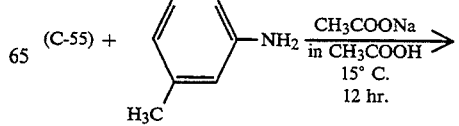

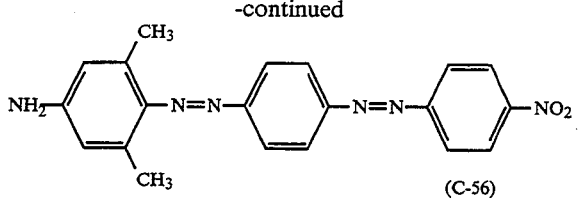

(C-56)

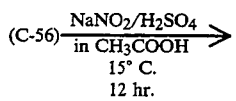

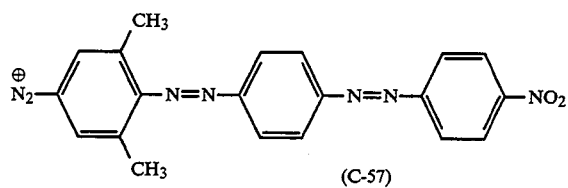

(C-57)

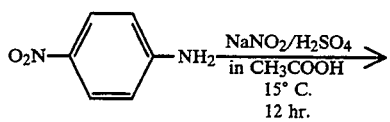

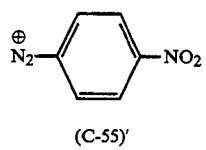

(C-55)'

2(C-55)' + (C-57) +

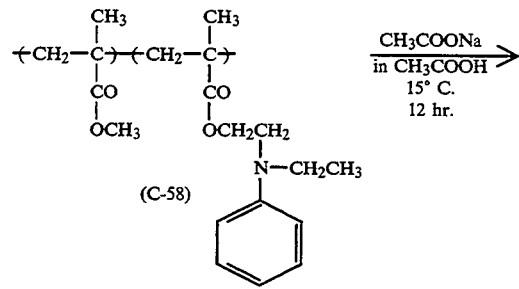

(C-58)

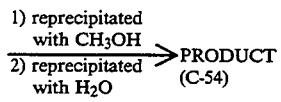

1) reprecipitated with CH₃OH
2) reprecipitated with H₂O
→ PRODUCT (C-54)

The compound represented by formula (C-58) was synthesized according to the synthesis of the compound represented by formula (C-33).

The resultant polymer compound was dissolved in Cellosolve ® acetate to form a 18% by weight solution. The gel component present in small amounts in this polymer solution could be easily filtered (differential pressure of 1.5 kg/cm²) using a filter with a 0.5 μm mesh, and easily removed. From this solution, an optically uniform film of thickness 20 μm or more was formed by means of either a spin coating process or a doctor blade process. Control of the film thickness was possible in the doctor blade process by means of regulating the space between the blade and the substrate, and in the spin coating process by means of regulating the concentration of the high polymer solution or the rotating speed of the spin coater. For example, when a 18% by weight solution was spin coated at a speed of 600 rpm, a film of thickness 22 μm was obtained.

Electrodes were then positioned above and below the resultant film, and a voltage of 1.5 MV/cm was applied in an environment of 180° C. While continually applying the voltage, the system was cooled to room temperature, resulting in a film with an electro-optic constant of 71 pm/V at a wavelength of 1.3 μm.

Comparative Example 7

A polymer compound represented by formula (C-54) possessing 99.5 of $l_{13}$, 0 of $m_{13}$, and 0.5 of $n_{13}$ was employed as a comparative polymer compound. This polymer compound afforded to form a film which was similar to that obtained in Example 8. However, when the film was poled under the same conditions as described in Example 8, the poled film possessed an electro-optic constant of 30 pm/v or less.

Comparative Example 8

A polymer compound represented by formula (C-54) possessing 85 of $l_{13}$, 0 of $m_{13}$, and 15 of $n_{13}$ was employed as a comparative polymer compound. From this polymer compound, a polymer solution could not be formed due to gelation in Cellosolve ® acetate. For this reason, film formation could not be achieved using this polymer compound.

Example 9

A polymer compound represented by formula (C-59) was synthesized.

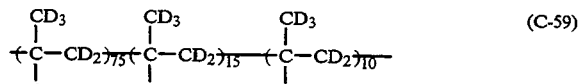
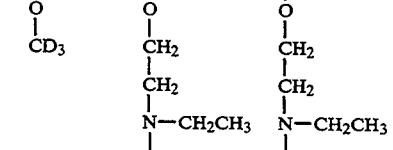
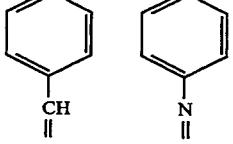
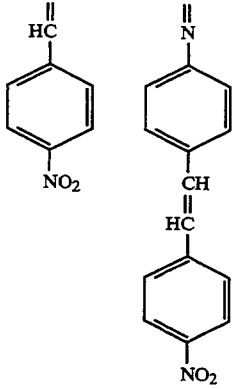

(C-59)

The synthesis of this polymer compound was carried out as follows:

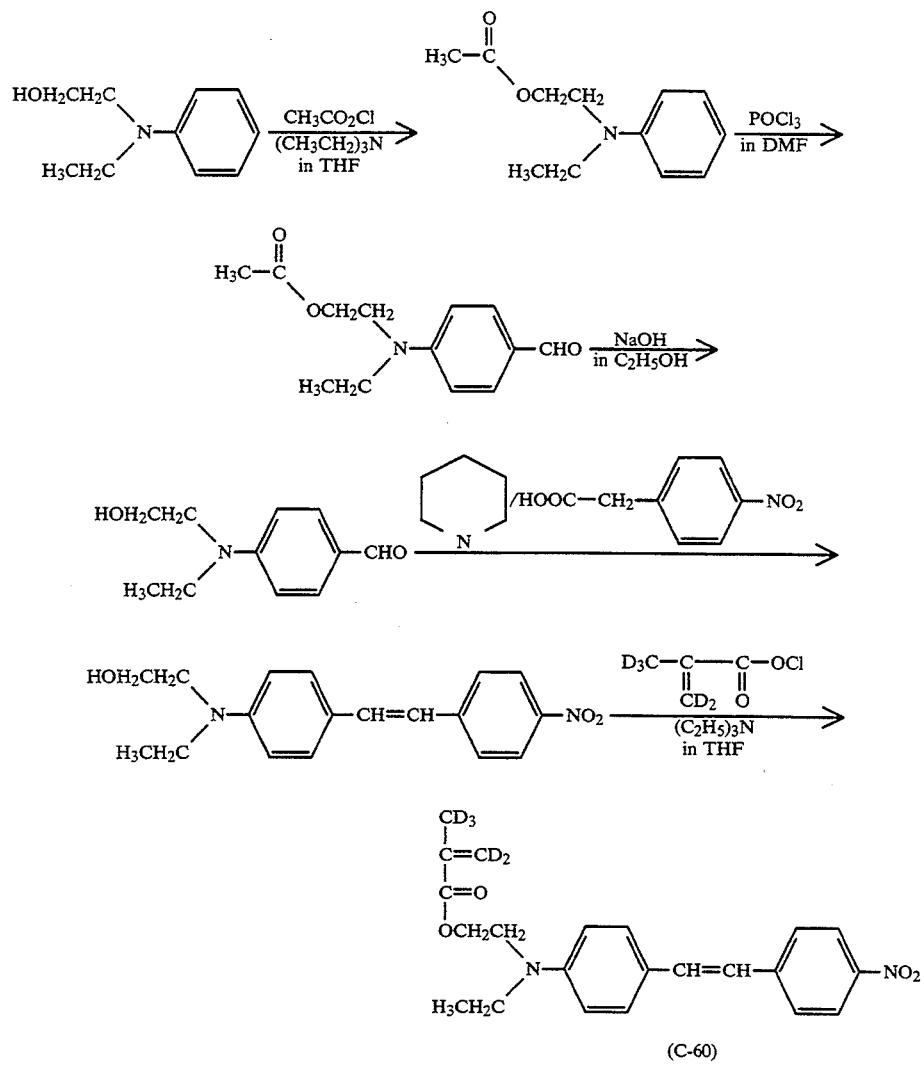
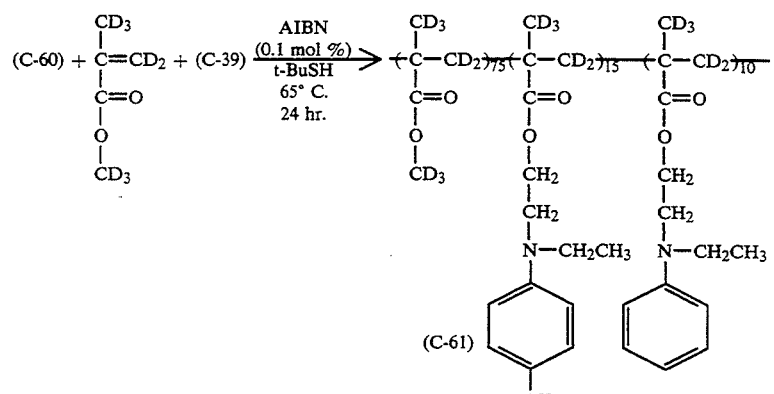
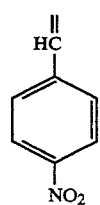

-continued

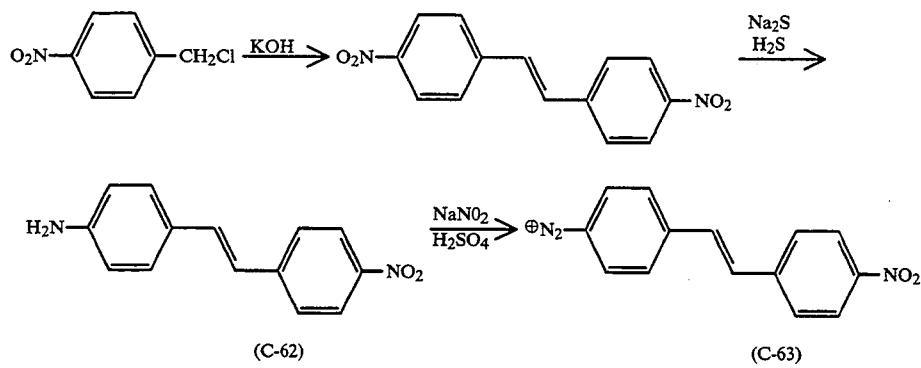

(C-62)   (C-63)

$$(C\text{-}63) + (C\text{-}61) \xrightarrow[\substack{\text{in } CH_3COOH \\ 15°\ C. \\ 12\ hr.}]{CH_3COONa} \xrightarrow[\substack{1)\ \text{reprecipitated} \\ \text{with } CH_3OH \\ 2)\ \text{reprecipitated} \\ \text{with } H_2O}]{} \text{PRODUCT} \quad (C\text{-}59)$$

The resultant polymer compound was dissolved in chlorobenzene to form a 20% by weight solution. The gel component present in small amounts in this polymer solution could be easily filtered (differential pressure of 0.5 kg/cm$^2$) using a filter with a 0.5 μm mesh, and easily removed. From this solution, an optically uniform film of thickness 20 μm or more was formed by means of either a spin coating process or a doctor blade process. Control of the film thickness was possible in the doctor blade process by means of regulating the space between the blade and the substrate, and in the spin coating process by means of regulating the concentration of the high polymer solution or the rotating speed of the spin coater. For example, when a 13% by weight solution was spin coated at a speed of 1500 rpm, a film of thickness 5 μm was obtained.

Electrodes were then positioned above and below the resultant film, and a voltage of 2.0 MV/cm was applied in an environment of 140° C. While continually applying the voltage, the system was cooled to room temperature, resulting in a film with an electro-optic constant of 38 pm/V at a wavelength of 1.3 μm.

A film of thickness 5 μm was processed using an oxygen plasma etching process to produce an optical waveguide having a width of 5 μm. As a cladding of the waveguide, an epoxy resin was employed. The optical loss of the optical waveguide was 0.2 dB/cm at a wavelength of 1.3 μm.

Comparative Example 9

A polymer compound represented by formula (C-64) was synthesized.

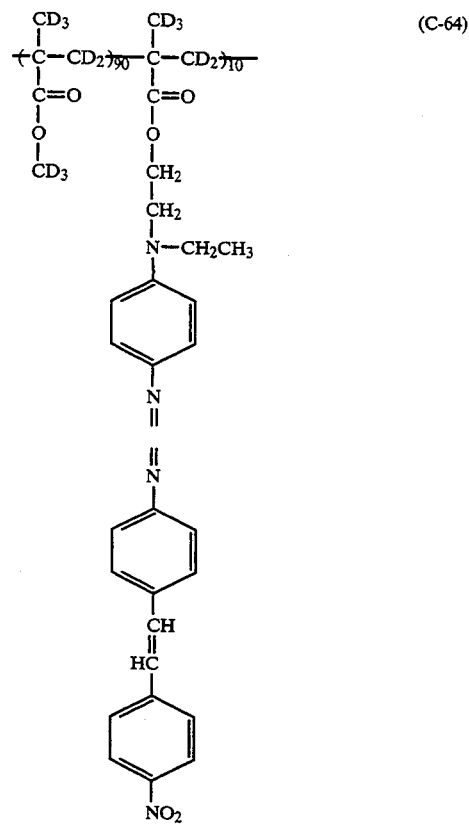

The synthesis of this polymer compound was carried out according to the synthetic procedure described in Example 9.

The resultant polymer compound was liable to gelation in chlorobenzene. For this reason, it was difficult to filter the polymer compound in chlorobenzene using a filter with a 5.0 μm mesh. Therefore, the polymer compound in chlorobenzene was filtered using a filter with a 10.0 μm mesh to obtain a polymer solution. From this polymer solution, a film was produced by a spin coating process. Using this film, an optical waveguide was manufactured according to the procedure described described in Example 9. The optical loss of the optical waveguide was 10 dB/cm or more at a wavelength of 1.3 μm.
Example 10
A polymer compound represented by formula (C-65) was synthesized.
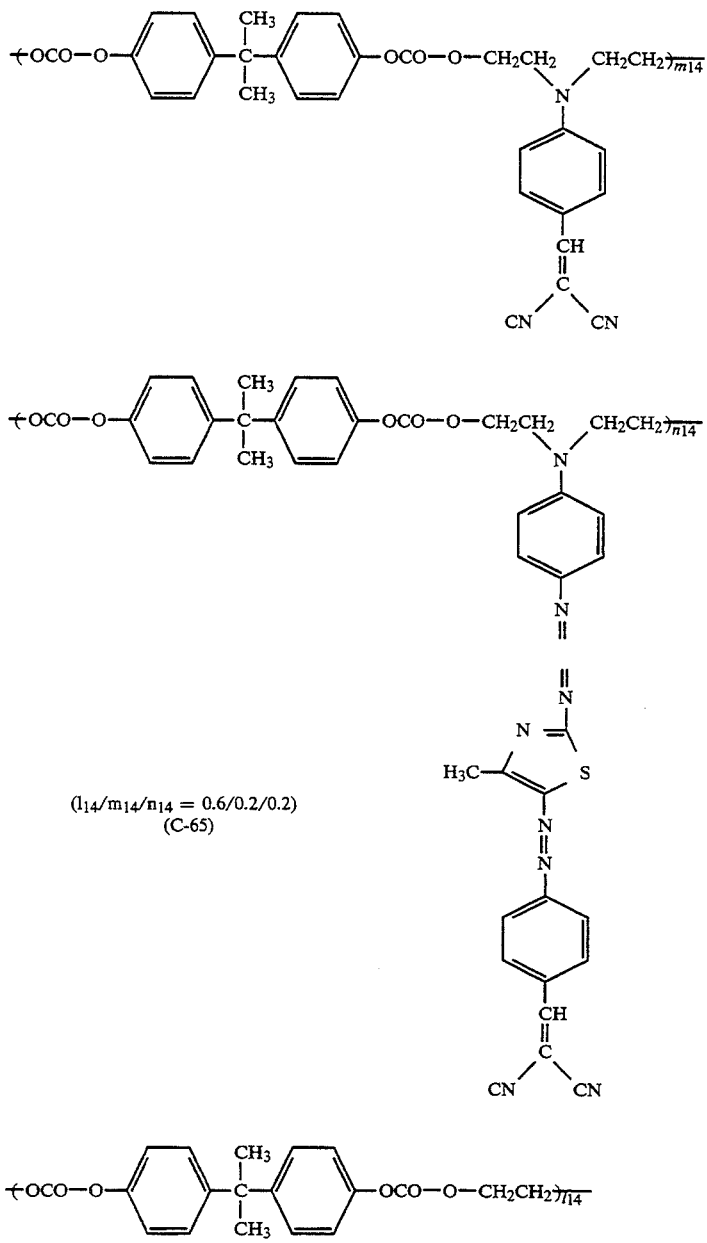
$(l_{14}/m_{14}/n_{14} = 0.6/0.2/0.2)$
(C-65)
The synthesis of the polymer compound was carried out as follows:
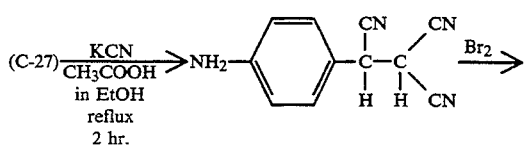
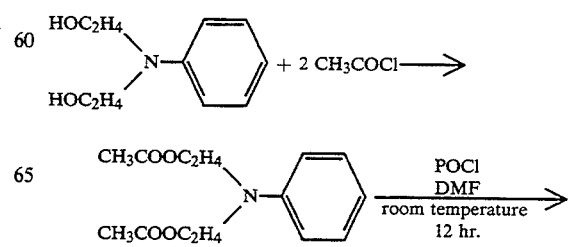

-continued

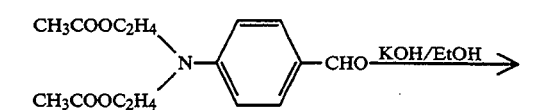

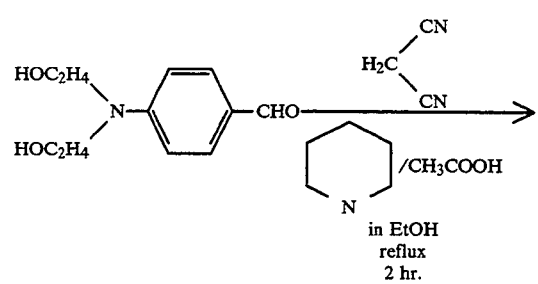

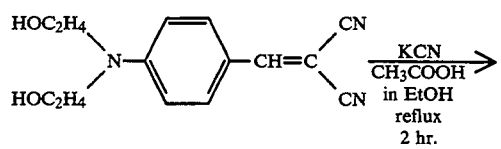

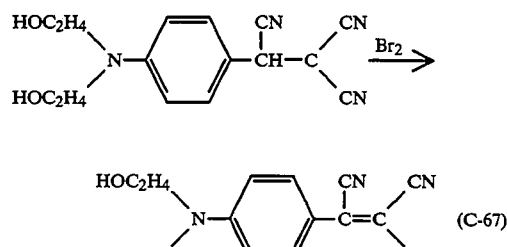

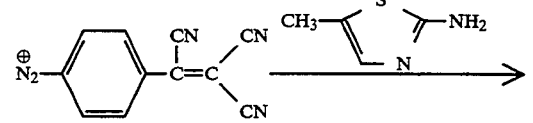

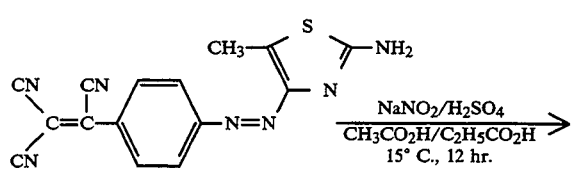

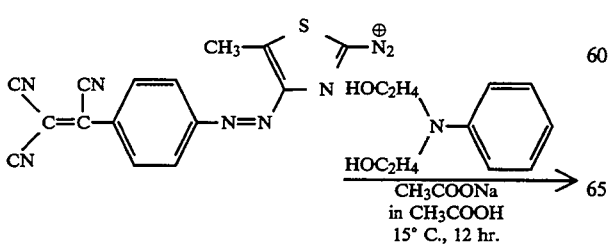

-continued

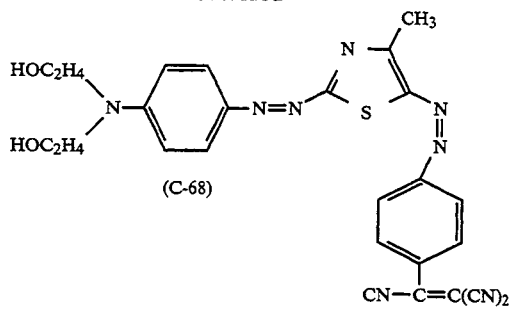

(C-68) + (C-67) +

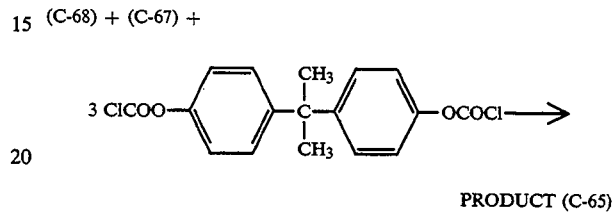

PRODUCT (C-65)

The resultant polymer compound was dissolved in N,N-dimethylformamide to form a 15% by weight solution. The gel component present in small amounts in this polymer solution could be easily filtered (differential pressure of 1.5 kg/cm²) using a filter with a 0.5 μm mesh, and was thus easily removed. From this solution, an optically uniform film of thickness 10 μm or more was formed by means of either a spin coating process or a doctor blade process. Control of the film thickness was possible in the doctor blade process by means of regulating the space between the blade and the substrate, and in the spin coating process by means of regulating the concentration of the high polymer solution or the rotating speed of the spin coater. For example, when a 10% by weight solution was spin coated at a speed of 600 rpm, a film of thickness 7 μm was obtained.

Electrodes were then positioned above and below the resultant film, and a voltage of 1.5 MV/cm was applied in an environment of 180° C. While continually applying the voltage, the system was cooled to room temperature, resulting in a film with an electro-optic constant of 90 pm/V at a wavelength of 1.55 μm.

The transmittance of a film of thickness 10 μm at a wavelength of 1.55 μm was 99% or greater.

Comparative Example 10

A polymer compound represented by formula (C-65) possessing 6 of $l_{14}$, 0 of $m_{14}$, and 2 of $n_{14}$ was employed as a comparative polymer compound. This polymer compound was liable to gelation in N,N-dimethylformamide. For this reason, it was difficult to filter the polymer compound in N,N-dimethylformamide using a filter with a 5.0 μm mesh. Therefore, the polymer compound in N,N-dimethylformamide was filtered using a filter with a 10.0 μm mesh to obtain a polymer solution. From this polymer solution, a film of thickness 10 μm or more was produced by means of a spin coating process.

The transmittance of a film of thickness 10 μm at a wavelength of 1.55 μm was 90% or smaller.

Example 11

A polymer compound represented by formula (C-77) was synthesized.

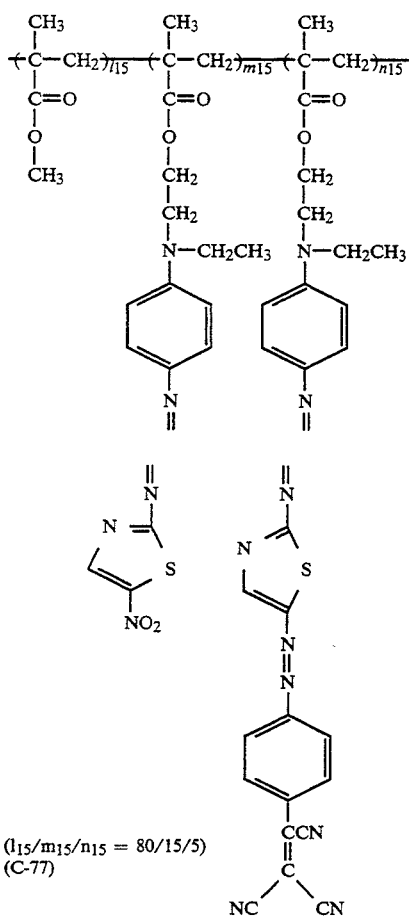

($l_{15}/m_{15}/n_{15}$ = 80/15/5)
(C-77)

The synthesis of the polymer compound was carried out as follows:

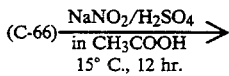

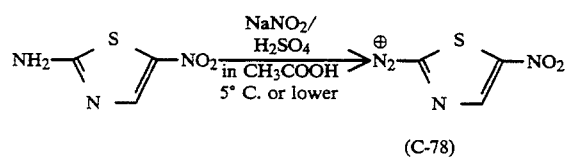

(C-78)

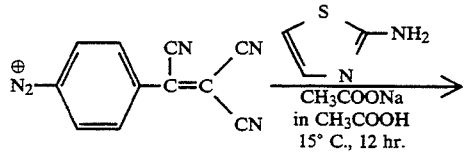

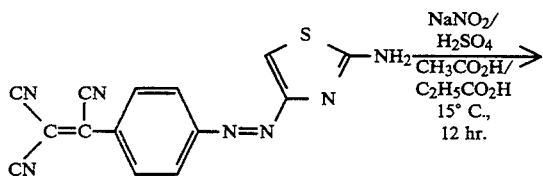

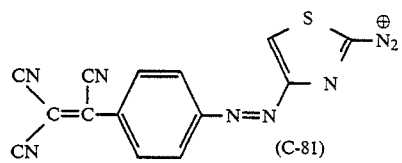

(C-81)

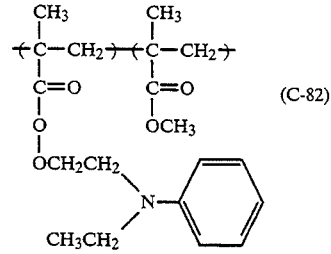

(C-82)

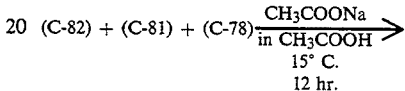

15° C.
12 hr.

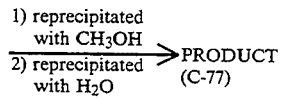

The compound represented by formula (C-82) was synthesized according to the synthesis of the compound represented by formula (C-33).

The resultant polymer compound (C-82) was dissolved in methyl isobutyl ketone to form a 18% by weight solution. The gel component present in small amounts in this polymer solution could be easily filtered (differential pressure of 1.5 kg/cm$^2$) using a filter with a 0.5 μm mesh, and was thus easily removed. From this solution, an optically uniform film of thickness 10 μm or more was formed by means of either a spin coating process or a doctor blade process. Control of the film thickness was possible in the doctor blade process by means of regulating the space between the blade and the substrate, and in the spin coating process by means of regulating the concentration of the polymer solution or the rotating speed of the spin coater. For example, when a 15% by weight solution was spin coated at a speed of 2000 rpm, a film of thickness 9 μm was obtained.

Electrodes were then positioned above and below the resultant film, and a voltage of 1.5 MV/cm was applied in an environment of 180° C. While continually applying the voltage, the system was cooled to room temperature, resulting in a film with an electro-optic constant of 96 pm/V at a wavelength of 1.55 μm.

The transmittance of a film of thickness 10 μm at a wavelength of 1.55 μm was 99% or greater.

Comparative Example 11

A polymer compound represented by formula (C-77) possessing 90 of $l_{15}$, 0 of $m_{15}$, and 10 of $n_{15}$ was employed as a comparative polymer compound. Gelation of this polymer compound was performed in methyl isobutyl ketone. For this reason, a polymer solution could not be obtained. Therefore, film formation could not be achieved using this polymer compound.

As described above, an optically uniform film, which was not able to be obtained from prior art poled polymers, is obtainable using the second-order nonlinear optical polymer according to the present invention due to the specific polymer structure thereof, without deterioration of the second-order nonlinear optical properties as well as reduction of the second-order nonlinear optical effects. Therefore, according to the present invention, the allowable range for application of poled polymers possessing enhanced second-order nonlinear optical properties is greatly expanded.

The present invention has been described in detail with respect to the examples, and it should now be apparent from the foregoing, to those skilled in the art, that changes and modifications may be made without departing from broader aspects of the invention, and it is the intention, therefore, in the appended claims to cover all such changes and modifications that fall within the true nature of the invention.

What is claimed is:

1. A second-order nonlinear optical polymer comprising a polymer backbone and side groups bonded to the polymer backbone, wherein the side groups include one or more of a first nonlinear optical group represented by the following formula (C-1) and one or more of a second nonlinear optical group represented by the following formula (C-2) or (C-2)':

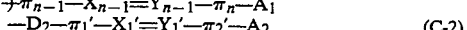
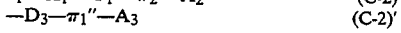

wherein $\pi_1$ to $\pi_n$, $\pi'_1$, $\pi'_2$, and $\pi''_1$ each represent independently a $\pi$-conjugated cyclic compound group; $X_1$ to $X_{n-1}$, $X'_1$, $Y_1$ to $Y_{n-1}$, and $Y'_1$ each represent independently CH, N, or N→O; $A_1$, $A_2$, and $A_3$ each represent independently an electron attracting group; $D_1$, $D_2$, and $D_3$ each represent independently an electron donating group; and n represents an integer of 3 or greater.

2. A second-order nonlinear optical polymer as recited in claim 1, wherein the first nonlinear optical group represented by formula (C-1) is selected from groups represented by the following formulae (C-3), (C-4), or (C-5), and the second nonlinear optical group represented by formula (C-2) is selected from groups represented by the following formulae (C-6), (C-7), or (C-8):

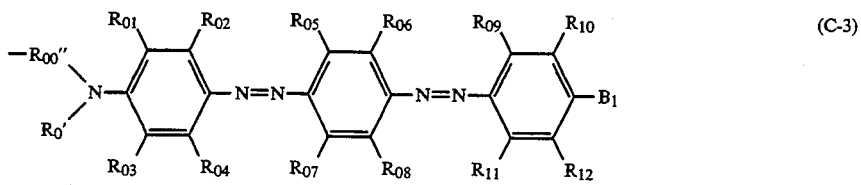

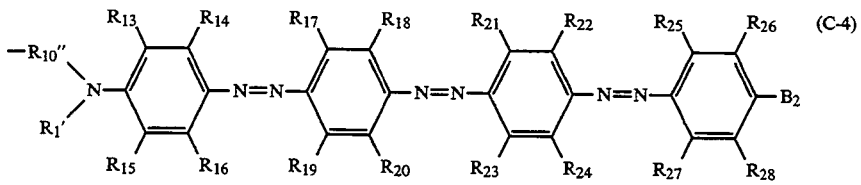

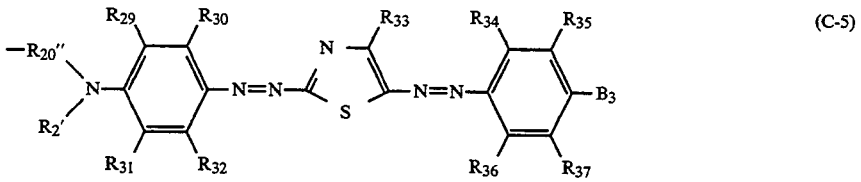

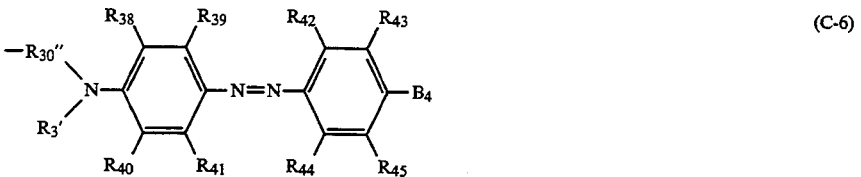

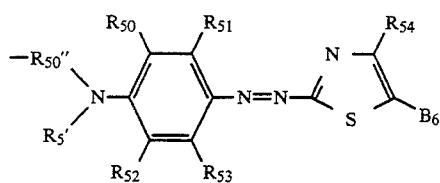

wherein R″$_{00}$ to R″$_{50}$ each represent independently an alkylene group shown by the formula: —CH$_2$(CH$_2$)$_h$CH$_2$— wherein h is 0 or an integer, of which one or more hydrogen atoms may be substituted with deuterium atoms; R′$_0$ to R′$_5$ each represent independently a alkyl group, deuterized alkyl group, substituted alkyl group, substituted deuterized alkyl group, hydrogen atom, deuterium atom, or halogen atom, R$_{01}$ to R$_{54}$ each represent independently an alkyl group, deuterized alkyl group, substituted alkyl group, substituted deuterized alkyl group, hydrogen atom, deuterium atom, or halogen atom; and B$_1$ to B$_6$ each represent independently an electron attracting group.

3. A second-order nonlinear optical polymer as recited in claim 1, which includes three units represented by the following formulae (C-9), (C-10), and (C-11), wherein the unit represented by formula (C-11) includes the first nonlinear optical group represented by formula (C-1) and the unit represented by formula (C-10) includes the second nonlinear optical group represented by formula (C-2):

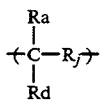 (C-9)

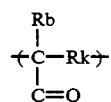 (C-10)

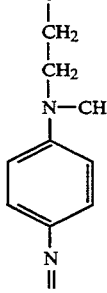

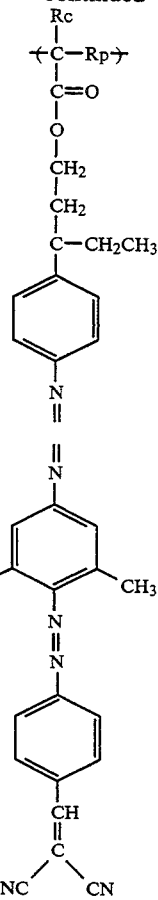 (C-11)

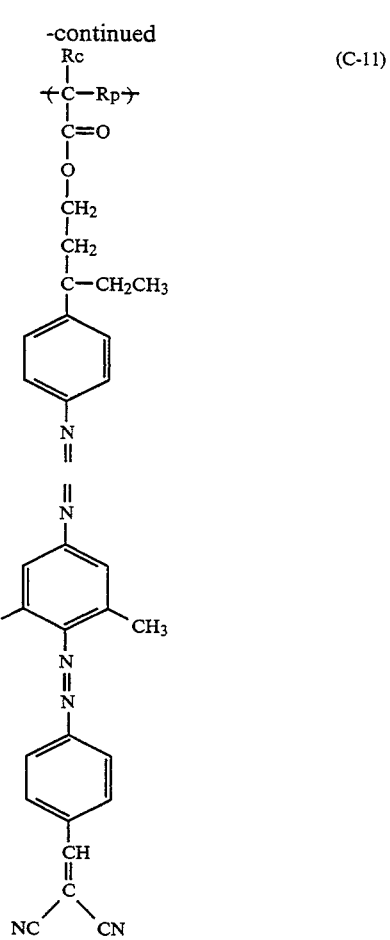

wherein R$_a$ to R$_c$ each represent independently an alkyl group, deuterized alkyl group, substituted alkyl group, substituted deuterized alkyl group, hydrogen atom, deuterium atom, phenyl group, deuterized phenyl group, substituted phenyl group, substituted deuterized phenyl group, or halogen atom; R$_d$ represents a phenyl group, deuterized phenyl group, substituted phenyl group, substituted deuterized phenyl group, halogen atom, —COOR$_e$, or —CONR$_f$R$_g$; and R$_j$, R$_k$, and R$_p$ each represent independently a group represented by a formula: —CH$_2$— or —CD$_2$—.

4. A second-order nonlinear optical polymer as recited in claim 3, represented by the following formula (C-12):

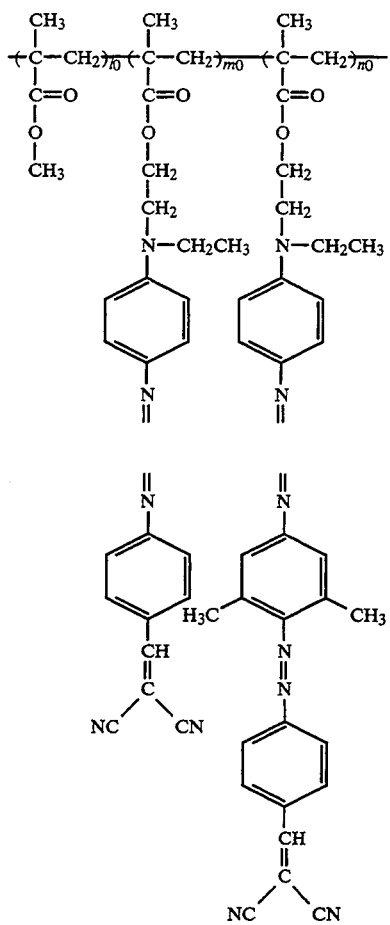
(C-12)

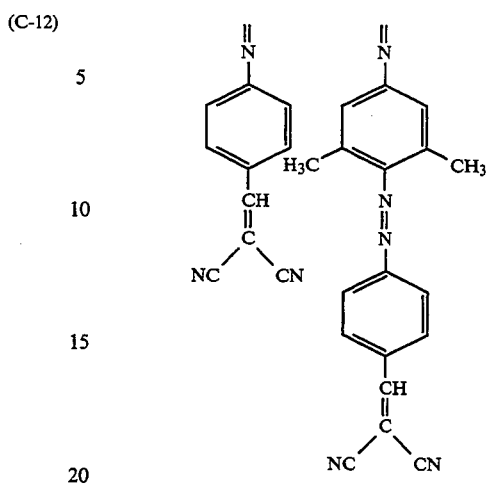

wherein $l_2$, $m_2$, and $n_2$ represent proportions in the range of 80 to 90 mol %, 5 to 10 mol %, and 5 to 10 mol %, respectively, wherein three units are randomly copolymerized and the polymer has a number average molecular weight in the range of 10,000 to 100,000.

6. A second-order nonlinear optical polymer as recited in claim 3, represented by the following formula (C-21):

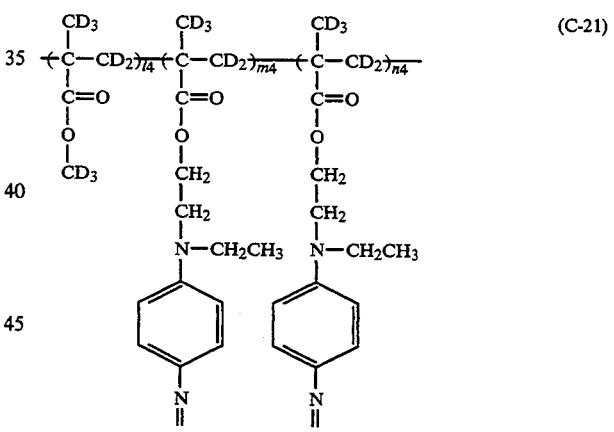
(C-21)

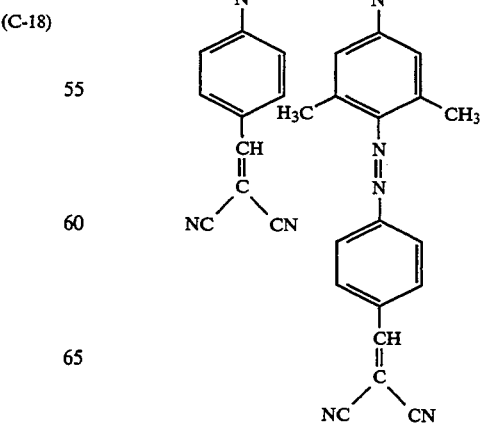

wherein $l_O$, $m_O$, and $n_O$ represent proportions in the range of 80 to 90 mol %, 5 to 10 mol %, and 5 to 10 mol %, respectively, wherein three units are randomly copolymerized and the polymer has a number average molecular weight in a range of 10,000 to 100,000.

5. A second-order nonlinear optical polymer as recited in claim 3, represented by the following formula (C-18):

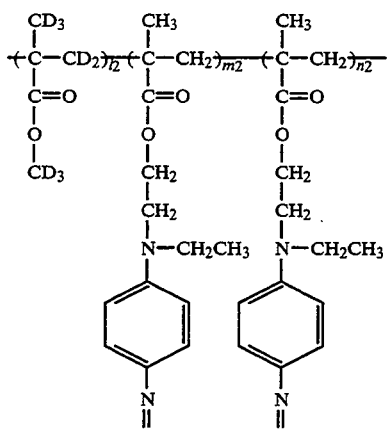
(C-18)

wherein l₄, m₄, and n₄ represent proportions in the range of 80 to 90 mol %, 5 to 10 mol %, and 5 to 10 mol %, respectively, wherein three units are randomly copolymerized and the polymer has a number average molecular weight in the range of 10,000 to 100,000.

7. A method for producing a second-order nonlinear optical polymer comprising the steps of:

subjecting (a) (N-ethyl)anilino methacrylate, of which one or more hydrogen atoms may be substituted with deuterium atoms, in the amount of (m+n) parts by mole and (b) methyl methacrylate, of which one or more hydrogen atoms may be substituted with deuterium atoms, in the amount of (1) parts by mole to a polymerization reaction to form a copolymer having a number average molecular weight of 10,000 to 100,000;

subjecting both (m) parts by mole or more of a compound represented by the following formula (C-16) and (n) parts by mole or more of a compound represented by the following formula (C-17) to a diazotization reaction to form diazonium salts; and subsequently subjecting the copolymer and the diazonium salts to a diazocoupling reaction to produce a second-order nonlinear optical polymer:

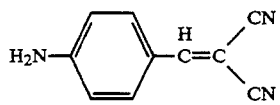 (C-16)

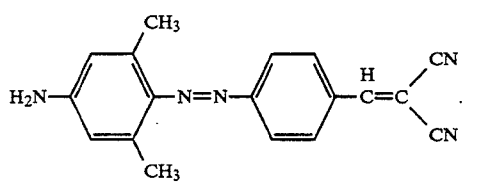 (C-17)

8. A method for producing a second-order nonlinear optical polymer as recited in claim 7, comprising the steps of:

subjecting a compound represented by the following formula (C-13) in the amount of (m₁+n₁) parts by mole and a compound represented by the following formula (C-14) in the amount of (1₁) parts by mole to a polymerization reaction to form a copolymer represented by the following formula (C-15) having a number average molecular weight of 10,000 to 100,000;

subjecting both (m₁) parts by mole or more of a compound represented by formula (C-16) and (n₁) parts by mole or more of a compound represented by formula (C-17) to a diazotization reaction to form diazonium salts; and subsequently subjecting the copolymer represented by formula (C-15) and the diazonium salts to a diazocoupling reaction:

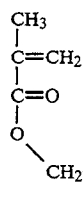 (C-13)

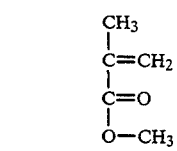 (C-14)

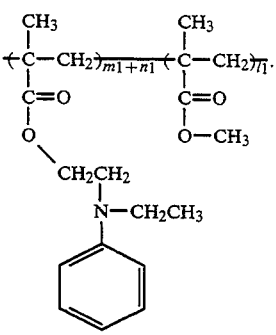 (C-15)

9. A method for producing a second-order nonlinear optical polymer as recited in claim 7, comprising the steps of:

subjecting a compound represented by the following formula (C-13) in the amount of (m₃+n₃) parts by mole and a compound represented by the following formula (C-19) in the amount of (1₃) parts by mole to a polymerization reaction to form a copolymer represented by the following formula (C-20) having a number average molecular weight of 10,000 to 100,000;

subjecting both (m₃) parts by mole or more of a compound represented by formula (C-16) and (n₃) parts by mole or more of a compound represented by formula (C-17) to a diazotization reaction to form diazonium salts; and subsequently subjecting the copolymer represented by formula (C-20) and the diazonium salts to a diazocoupling-reaction:

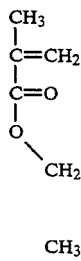 (C-13)

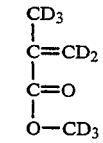 (C-19)

-continued

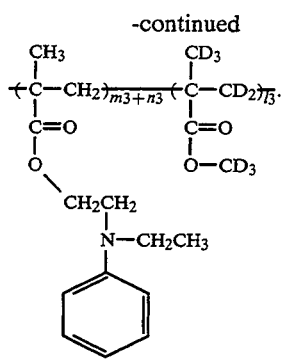
(C-20)

10. A method for producing a second-order nonlinear optical polymer as recited in claim 7, comprising the steps of:

subjecting a compound represented by the following formula (C-22) in the amount of ($m_5+n_5$) parts by mole and a compound represented by formula (C-19) in the amount of ($l_5$) parts by mole to a polymerization reaction to form a copolymer represented by the following formula (C-23) having a number average molecular weight of 10,000 to 100,000;

subjecting both ($m_5$) parts by mole or more of a compound represented by formula (C-16) and ($n_5$) parts by mole or more of a compound represented by formula (C-17) to a diazotization reaction to form diazonium salts; and subsequently subjecting the copolymer represented by formula (C-23) and the diazonium salts to a diazocoupling reaction:

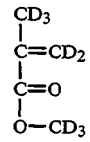
(C-19)

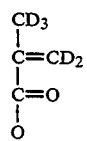
(C-22)

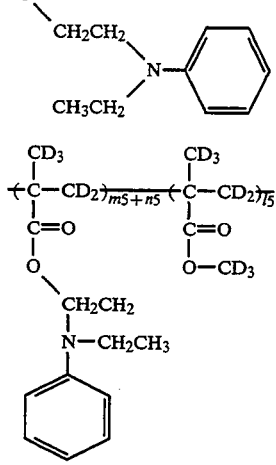
(C-23)

* * * * *

UNITED STATES PATENT AND TRADEMARK OFFICE
CERTIFICATE OF CORRECTION

PATENT NO. : 5,359,008  
DATED : October 25, 1994  
INVENTOR(S) : Michiyuki AMANO et al Page 1 of 7

It is certified that error appears in the above-indentified patent and that said Letters Patent is hereby corrected as shown below:

Claim 1, Column 48, Lines 6-7, formulae (C-2) and (C-2)' should read $$-D_2-\pi'_1-X'_1=Y'_1-\pi'_2-A_2 \qquad (C-2)$$

$$-D_3-\pi''_1-A_3 \qquad (C-2)'$$

Abstract, Lines 11-12, formulae (C-2) and (C-2)' should read $$-D_2-\pi'_1-X'_1=Y'_1-\pi'_2-A_2 \qquad (C-2)$$

$$-D_3-\pi''_1-A_3 \qquad (C-2)'$$

UNITED STATES PATENT AND TRADEMARK OFFICE
CERTIFICATE OF CORRECTION

PATENT NO. : 5,359,008
DATED : October 25, 1994
INVENTOR(S) : Michiyuki AMANO et al It is certified that error appears in the above-indentified patent and that said Letters Patent is hereby corrected as shown below:

Claim 2, Column 49, Line 19, "a" should read --an--.

Claim 9, Column 54, Lines 36, "$(m_3+n3)$" should read --$(m_3+n_3)$--.

UNITED STATES PATENT AND TRADEMARK OFFICE
CERTIFICATE OF CORRECTION

PATENT NO. : 5,359,008
DATED : October 25, 1994
INVENTOR(S) : Michiyuki AMANO et al It is certified that error appears in the above-indentified patent and that said Letters Patent is hereby corrected as shown below:

Claim 2, Columns 47-48, lower half of both columns, and Column 49, top of column, formulae (C-3) - (C-8) should read

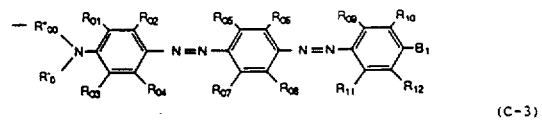
(C-3)

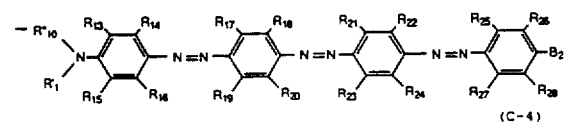
(C-4)

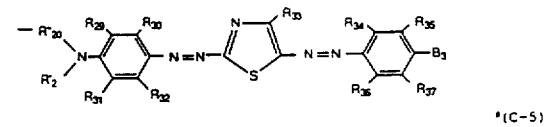
(C-5)

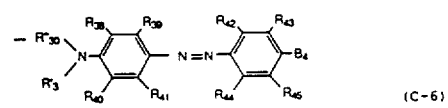
(C-6)

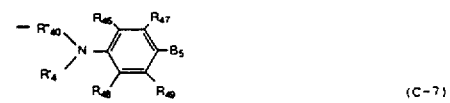
(C-7)

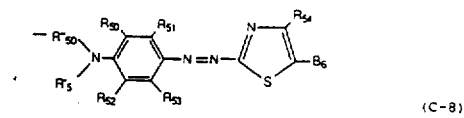
(C-8)

UNITED STATES PATENT AND TRADEMARK OFFICE
CERTIFICATE OF CORRECTION

PATENT NO. : 5,359,008
DATED : October 25, 1994
INVENTOR(S) : Michiyuki AMANO et al It is certified that error appears in the above-indentified patent and that said Letters Patent is hereby corrected as shown below:

Claim 3, Column 49, bottom of column, and Column 50, top of column, formulae (C-10) - (C-11) should read

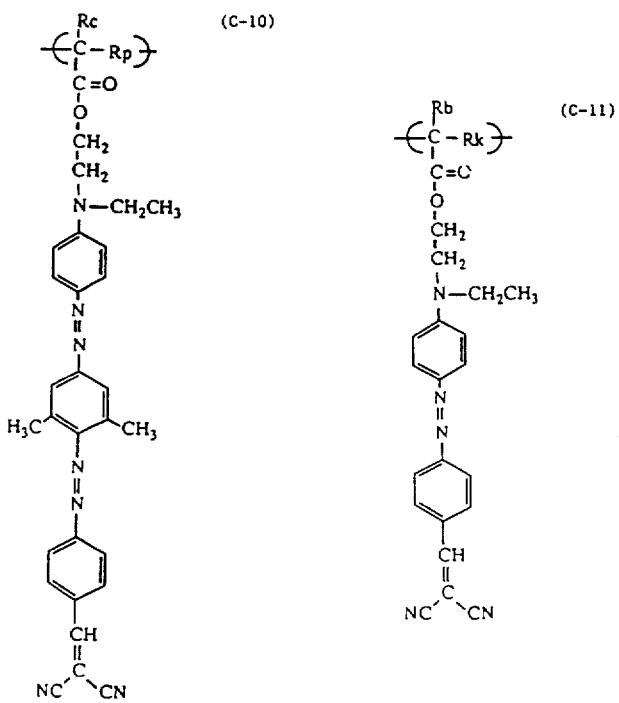

UNITED STATES PATENT AND TRADEMARK OFFICE
CERTIFICATE OF CORRECTION

PATENT NO. : 5,359,008
DATED : October 25, 1994
INVENTOR(S) : Michiyuki AMANO et al It is certified that error appears in the above-indentified patent and that said Letters Patent is hereby corrected as shown below:

Claim 4, Column 51, top half of column, formula (C-12) should read

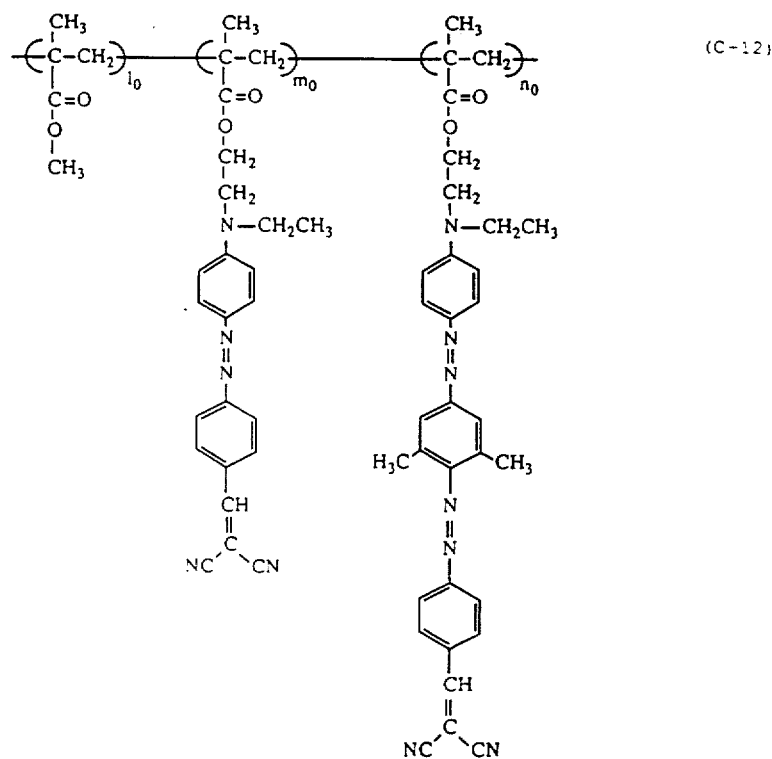

UNITED STATES PATENT AND TRADEMARK OFFICE
CERTIFICATE OF CORRECTION

PATENT NO. : 5,359,008
DATED : October 25, 1994
INVENTOR(S) : Michiyuki AMANO et al It is certified that error appears in the above-indentified patent and that said Letters Patent is hereby corrected as shown below:

Claim 6, Column 52, bottom half of column, formula (C-21) should read

UNITED STATES PATENT AND TRADEMARK OFFICE
CERTIFICATE OF CORRECTION

PATENT NO. : 5,359,008
DATED : October 25, 1994
INVENTOR(S) : Michiyuki AMANO et al It is certified that error appears in the above-indentified patent and that said Letters Patent is hereby corrected as shown below:

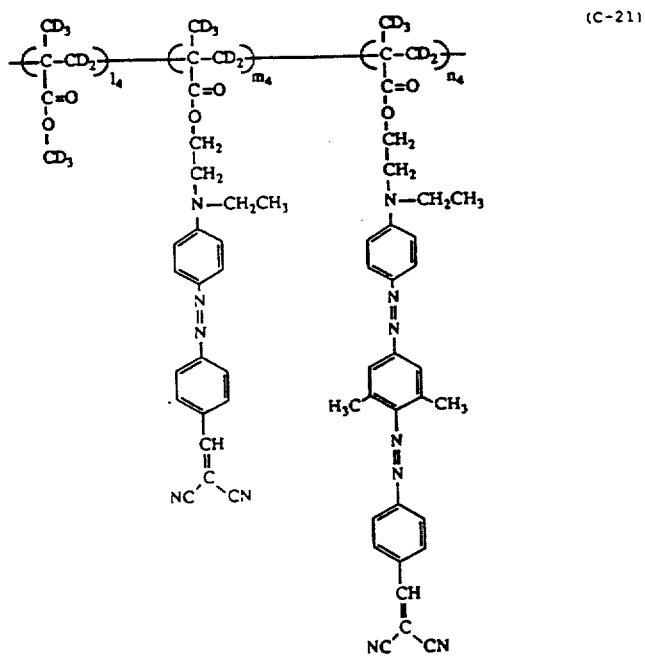

Signed and Sealed this

Twenty-sixth Day of September, 1995

Attest:

BRUCE LEHMAN

Attesting Officer        Commissioner of Patents and Trademarks